United States Patent [19]

Chow et al.

[11] Patent Number: 5,285,474
[45] Date of Patent: Feb. 8, 1994

[54] METHOD FOR EQUALIZING A MULTICARRIER SIGNAL IN A MULTICARRIER COMMUNICATION SYSTEM

[75] Inventors: Jacky Chow, Mountain View; John M. Cioffi, Cupertino, both of Calif.

[73] Assignee: The Board of Trustees of the Leland Stanford, Junior University, Stanford, Calif.

[21] Appl. No.: 898,104

[22] Filed: Jun. 12, 1992

[51] Int. Cl.$^5$ .................. H04B 1/38; H04L 5/16; H03H 7/30; H03H 7/40
[52] U.S. Cl. .................................. 375/13; 375/8; 375/14
[58] Field of Search .................. 375/11, 12, 13, 14, 375/8, 9; 379/406, 410, 411

[56] References Cited

PUBLICATIONS

J. S. Chow et al, "A Discrete Multitone Transceiver System for HDSL Applications", Aug. 1991, IEEE Journal on Selected Areas in Communications, vol. 9, No. 6, pp. 895-908.

J. M. Cioffi et al, "A Data-Driven Multitone Echo Canceller," Globecom, Nov. 1991, pp. 57-61.

J. Pennington, "Techniques for Medium-Speed Data Transmission over HF Channels," IEE Proceedings, vol. 136, Pt. 1, No. 1, pp. 11-19, Feb. 1989.

*Primary Examiner*—Curtis Kuntz
*Assistant Examiner*—Duane Kobayashi
*Attorney, Agent, or Firm*—Claude A. S. Hamrick

[57] ABSTRACT

A method for optimizing a set of equalizer parameters of an equalizer to be used to equalize a multicarrier data signal that has been transmitted through a distorting channel, comprised of the steps of initializing the parameters, repeatedly sending a training sequence through the channel to the receiver, using the equalizer parameters, the received sequence, and a local replica of the training sequence to update a set of channel target response parameters, windowing the channel target response parameters, using the channel target response parameters, the received sequence and the local replica to update the equalizer parameters, and windowing the equalizer parameters. This training process is repeated until a predetermined convergence condition is detected.

13 Claims, 20 Drawing Sheets

METHOD FOR EQUALIZING A MULTICARRIER SIGNAL IN A MULTICARRIER COMMUNICATION SYSTEM

FIELD OF THE INVENTION

The present invention pertains to systems for the transmission and reception of multicarrier, high-speed data signals, and more particularly, to a method of optimizing the equalization of a multicarrier, high speed data signal that has been transmitted through a severely distorting medium.

BACKGROUND OF THE INVENTION

A basic multicarrier transmitter is shown in FIG. 1. Serial input data at a rate $Mf_s$ bit/s are grouped into blocks of M bits at a symbol rate of $f_s$. The M bits are used to modulate $N_c$ carriers ($m_n$ bits for carrier n) which are spaced $\Delta f_c$ apart across any usable frequency band. The preferred method of modulation is to use an Inverse Fast Fourier Transform (IFFT), which generates $N_{samp}$ (preferably equal to an integer power of 2) samples of a transmit signal for each block of M bits.

In the receiver the received signal is demodulated by each of the $N_c$ carriers, and the $m_n$ bits are recovered from each carrier. Again, the preferred method of demodulation is to sample the received signal, group the samples into blocks (preferably comprising a number of samples that is an integer power of 2), and perform a Fast Fourier Transform (FFT).

In such a transmitter the data symbol rate, the signal symbol rate, and the carrier frequency separation, $\Delta f_c$, are all equal, and the receiver uses all $N_{samp}$ samples to retrieve the data.

A more detailed discussion of the principles of multicarrier transmission and reception is given in J.A.C. Bingham, "Multicarrier Modulation For Data Transmission: An Idea Whose Time has Come", IEEE Commun. Mag., pp 5–14, May, 1990.

FIG. 2(a) shows the connection of a multicarrier transmitter 100 and a basic receiver 1000 through a channel 200. Input serial data are grouped into blocks, converted to a parallel form and encoded by an encoder 120, and modulated by an IFFT operation 130. The digital samples are then converted to analog by a digital-to-analog converter (DAC), low-pass filtered, and sent through a d.c-isolating transformer 140 to produce a transmitted signal which is input to the channel 200. In the receiver, a d.c. isolating transformer, low-pass filter, and analog-to-digital converter 1100 perform complementary operations to produce a digital received signal, followed by an FFT 1010 to produce a frequency-domain signal.

If the amplitude/frequency and delay/frequency responses of the channel are not constant across the whole of the used frequency band (that is, either is distorted), then the received signal will differ from the transmitted signal, and the signals presented to the decoder 1030 will differ from those output from the encoder 120. If the distortion is severe then the data on one carrier (i.e., in one sub-channel) will affect both the signals detected on other carriers (inter-channel interference, or ICI), and the signals detected in that sub-channel in the previous and subsequent symbol periods (inter-symbol interference, or ISI); the decoding device will make incorrect decisions, and data errors will occur. Even if the distortion is insufficient to cause errors by itself, it will reduce the immunity of the signal to any noise o interference that may be added in the channel. Therefore, some form of equalization of the received signal is nearly always necessary.

The most basic form of equalization is performed by the frequency-domain equalize (FEQ) 1020. This compensates individually for the attenuation and delay of each of the sub-channels; if the symbols are very long compared to the duration of the impulse response of the channel this is the only form of equalization that is required. Very long symbols, however, require large memories in both transmitter and receiver, and large amounts of computation in the receiver; they also cause a large delay between input of data to the transmitter and output from the receiver ("latency").

Such memory and computation requirements and such a delay are usually unacceptable, and therefore it is desirable to reduce the symbol length and, equivalently, increase the bandwidth of each of the sub-channels. Then, however, the attenuation and delay of the channel would no longer be constant across the band occupied by each sub-channel, and both ISI and ICI would result. Three methods of reducing this ISI and ICI have been used: (1) staggered modulation, (2) pre-equalization, and (3) use of a waiting, or guard, period before collecting samples for input to the FFT. We will briefly describe each of these, and then introduce the present invention, which uses a combination of the latter two.

1. Staggered Modulation: A form of staggered modulation was first described by B. R. Saltzberg, "Performance of an Efficient Parallel Data Transmission System", IEEE Trans. Commun. Tech., vol. COM-16, pp. 805–811, Dec. 1967. D. Chaffee and M. Mallory improved upon this by encoding and shaping the signals in each of the sub-channels so as to reduce the ICI. Modems manufactured by IMC Corporation used a combination of this method with pre-equalization. The amount of signal processing required in both transmitter and receiver is, however, very large.

2. Pre-equalization: A pre-equalizer 1040 can be inserted before the FFT as shown in FIG. 2(b) in order to compensate, either partially or fully, for the channel distortion. To avoid all ISI and ICI this pre-equalizer would have to perform the same function as the equalizer in a single-carrier modem (e.g., J.A.C. Bingham, The Theory and Practice of Modem Design, John Wilkey & Sons, New York, May 1988.); that is, it would have to make both the attenuation and the delay almost constant. Full pre-equalization has been widely used in single-carrier modems for use on the general switched telephone network (GSTN), where the channel distortion is moderate. For severely distorted channels, however, the amount of signal processing required in the receiver would be prohibitively large. The present inventors know of no multicarrier modems that use only pre-equalization.

3. Waiting period, guard period, or cyclic prefix: If it is judged that the distorted transient response of the channel lasts for less than L sample periods, then the signal symbol length can be increased from N to N+L samples by inserting L extra samples, known as a cyclic prefix, as shown in FIG. 2(c) at 150. If these extra samples are appropriately chosen and if the receiver discards the first L samples of each received symbol, as shown in the figure at 1050, then both ISI and ICI are greatly reduced.

This method was originally described by S. B. Weinstein and P. M. Ebert, "Data Transmission by Frequency-Division Multiplexing Using the Discrete Fourier Transform", IEEE Trans. Commun. Tech., vol. COM-19, pp. 628-634, Oct. 1971., and has been used in modems manufactured by Telebit Corporation for use on the GSTN. It can be seen that because only N of each block of N+L samples carry data information, the data throughput efficiency of the method is proportional to $N/(N+L)$. If, because of severe distortion, L is large, then, in order to maintain an acceptable efficiency, N would have to be very large; this would cause a very large (and probably unacceptable) latency.

The most common way of implementing the cyclic prefix is to duplicate the last L samples of the block of N data samples, and add them to the front of the block. Because all of the many (multi) carriers that are used have an integral number of cycles in the N samples, the sum of all the carriers, which comprises the data signal, would have a period of N samples, and there is continuity of signal between the prefix and the data signal.

An equivalent effect could be achieved by adding the extra L samples at the end of the block of N (a cyclic suffix), and using, as with the more conventional cyclic prefix, the last N samples of the composite block for the input to the FFT in the receiver.

4. A guard period combined with adaptive pre-equalization: If the channel distortion is very large, then a good compromise between minimizing the latency and the amount of signal processing and memory required, and maximizing the data throughput efficiency can be achieved by using a short guard period and a short adaptive equalizer (i.e., one with a small number of taps) in the receiver. This combination was proposed in J. S. Chow, J. C. Tu, and J. M. Cioffi, "A Discrete Multitone Transceiver System for HDSL Applications", IEEE JSAC, vol. 9, pp. 895-908, Aug. 1991.

BRIEF DESCRIPTION OF THE PRIOR ART

Adaptation in the Time Domain

It can be seen from FIG. 3 that if the transient response of the channel lasts for only L samples, then the response to a new block (data plus prefix) will have reached a steady state in time for the remaining N samples to be used for an undistorted input to the FFT. Therefore, when a guard period is used, the task of the pre-equalizer is to compress the channel impulse response to the length of the cyclic prefix. This is discussed in detail in J. S. Chow, J. C. Tu, and J. M. Cioffi, "A Discrete Multitone Transceiver System for HDSL Applications", IEEE JSAC, vol. 9, pp. 895-908, Aug. 1991.

The basic problem is shown in FIG. 4. The transmit signal, x, is input to the channel, p, noise is added to it, and the noisy, distorted signal is input to a pre-equalizer, w. The output signal, z, should appear to have passed through a "target" channel with impulse response b, which is of length L or less. The adaptation of the pre-equalizer is therefore performed by driving to zero the difference between z and the output of the channel target. The input to the target response b should be the same as the input to the channel, x. During training this transmitted data signal is known to the receiver, so a locally generated x is used; this is known as receiver-reference adaptation. If adaptation during the reception of (a priori unknown) data is needed, then a reference "transmit" signal can be reconstructed from the decoded receive data.

A similar equalizer is needed for a method of detection of single-carrier data signals known as Maximum Likelihood Sequence Estimation (MLSE); several papers on the design of such an equalizer were published between twenty and ten years ago; see, for example, D. G. Messerschmidt, "Design of a Finite Impulse Response for the Viterbi Algorithm and Decision Feedback Equalizer", IEEE Intl. Conf. Commun. Record, pp. 37D.1-D.5, June 1974; D. D. Falconer and F. R. McGee, "Adaptive Channel Memory Truncation for Maximum Likelihood Sequence Estimation", Bell Syst. Tech. Jour., vol. 52, pp. 1641-1662, Nov. 1973.; S. U. H. Qureshi and E. E. Newhall, "An Adaptive Receiver for Data Transmission over Time-Dispersive Channels", IEEE Trans. Inf. Theory, vol. IT-19, pp. 448-457, July 1973; D. B. Richards, "Simulation of an Adaptive Channel Truncation Scheme for the Viterbi Algorithm", Internal report, EECS Dept., Univ. Calif., Berkeley, Dec. 1983.

It should be noted that for reception of a multicarrier signal the shortened response, b, is not of interest per se, but it must be learned in order to derive an error signal for the adaptation of the pre-equalizer, w.

In the discussion of pre-equalizers for MLSE the "channel target" was called either a Desired Impulse Response (DIR) or a Shortened Impulse Response (SIR). Earlier papers assumed some a priori response (a DIR), and adapted only the pre-equalizer; the problems of adaptation were similar to those encountered in the design of conventional equalizers for single-carrier systems (see for example, J. A. C. Bingham, The Theory and Practice of Modem Design, John Wilkey & Sons, New York, May 1988). It was later recognized, however, that if the channel distortion is severe, then any a priori choice of the shortened response will almost certainly be sub-optimum; both pre-equalizer and SIR must be adapted simultaneously.

The method chosen for this was the conventional stochastic gradient, or Least Mean Square (LMS), adaptation in the time domain, but convergence was very slow at best, and not always assured. Convergence of the individual LMS algorithms for pre-equalizer and SIR would be slow because of the severe channel distortion and the resultant correlation between successive input samples; convergence of the coupled algorithms was doubly problematic.

Another shortcoming of most of the work on pre-equalizers for MLSE was that it derived from the earlier problem of designing pre-equalizers for Decision Feedback Equalizers. For this earlier application the output of the pre-equalizer had to be essentially minimum-phase: that is, if the impulse response of the channel and pre-equalizer is expressed as a polynomial in the delay variable D, all dominant zeros of the polynomial should be outside the unit circle. This requirement usually carried over into the constraint that the SIR for MLSE should be minimum-phase.

In a contemporary paper, the inventors showed how the parameters of the pre-equalizer and channel target can be calculated by inverting a very large matrix. This requires the use of a powerful computer, and can only be considered as an "off-line" method. It is not suitable for "on-line" implementation by either a programmable digital signal processor or by dedicated digital LSI.

Adaptation in the Frequency Domain

S. U. H. Qureshi, "Fast Start-up Equalization with Periodic Training Sequences", IEEE Trans. Inform. Theory, vol. IT-23, pp. 553-563, Sept. 1977 described a method of transmitting a cyclic signal, and calculating the frequency-domain parameters of a full equalizer (i.e., one that attempts to equalize the channel impulse response to one single term). However, he chose the period of the cyclic signal to match the length of the equalizer, and thereby avoided any need for any windowing in the time domain. Furthermore, his adaptation was of only one set of parameters, without any generalizing to allow an arbitrary shortened channel response.

Adaptation in the Frequency Domain and Windowing in the Time Domain.

J. M. Cioffi and J. A. C. Bingham, "A Data-Driven Multitone Echo Canceller", Globe Com, Nov. 1991 described a method of adapting the taps of an echo canceller by updating in the frequency domain, transforming to the time domain and windowing, and then transforming back to the frequency domain. The technique of windowing is illustrated in FIG. 5. A long "unwindowed" time-domain response, which ideally should be much shorter, is multiplied by a windowing function that has the values of unity in the desired range and zero elsewhere; the product (the "windowed function") may then be transformed back into the frequency domain for further adaptation.

This technique is used in the present invention, but it is used here in a novel way in order to update two sets of interacting parameters; the previous paper was concerned with the adaptation of only a single set of parameters.

SUMMARY OF THE INVENTION

For a practical implementation of a pre-equalizer it is desirable to minimize the amount of computation that must be performed, or, equivalently, to optimize the performance for a given amount of computation. The optimum pre-equalizer of any given complexity (e.g., number of taps if the pre-equalizer is realized as a Tapped Delay Line) is the one that maximizes the ratio of the energy inside the range of the SIR to the energy outside that range, without imposing a constraint that the SIR be minimum phase.

The objective of the invention is a method for calculating the parameters of such a pre-equalizer that is much faster and more assured of correct convergence than any previous method, and is suitable for on-line implementation. Speed is to be achieved by orthogonalizing the adaptation of the parameters of the equalizer so that each can converge more or less independently of the rest; flexibility in the phase response of the SIR is to be achieved by an improved method of windowing the response (i.e., deciding which terms to include in the SIR, and which to consider as error) throughout the adaptation.

Briefly, a preferred embodiment of the present invention is a method for optimizing a set of equalizer parameters of an equalizer to be used to equalize a multicarrier data signal that has been transmitted through a distorting channel, comprised of the steps of initializing the parameters, repeatedly sending a training sequence through the channel to the receiver, using the equalizer parameters, the received sequence, and a local replica of the training sequence to update a set of channel target response parameters, windowing the channel target response parameters, using the channel target response parameters, the received sequence and the local replica to update the equalizer parameters, and windowing the equalizer parameters. This training process is repeated until a predetermined convergence condition is detected.

Among the advantages of the present invention is that it provides a method of optimizing equalizer parameters that converges to an accurate result faster than prior art methods.

Another advantage of the present invention is that it provides a method of optimizing equalizer parameters that converges to an accurate result more reliably than prior art methods.

These and other objects and advantages of the present invention will no doubt become apparent to those skilled in the art after having read the following detailed description of the preferred embodiment illustrated in the several figures of the drawing.

DETAILED DESCRIPTION OF THE PREFERRED EMBODIMENT

In the following descriptions, time-domain variables will be referred to with lower-case letters as a function of the delay variable D, while frequency-domain variables will be referred to by capital letters; for example, q(D) is a time-domain quantity whose corresponding frequency domain quantity would be Q. In addition, the term "channel target response" used in the following descriptions is equivalent to the shortened impulse response (SIR) described above.

Figure 6:
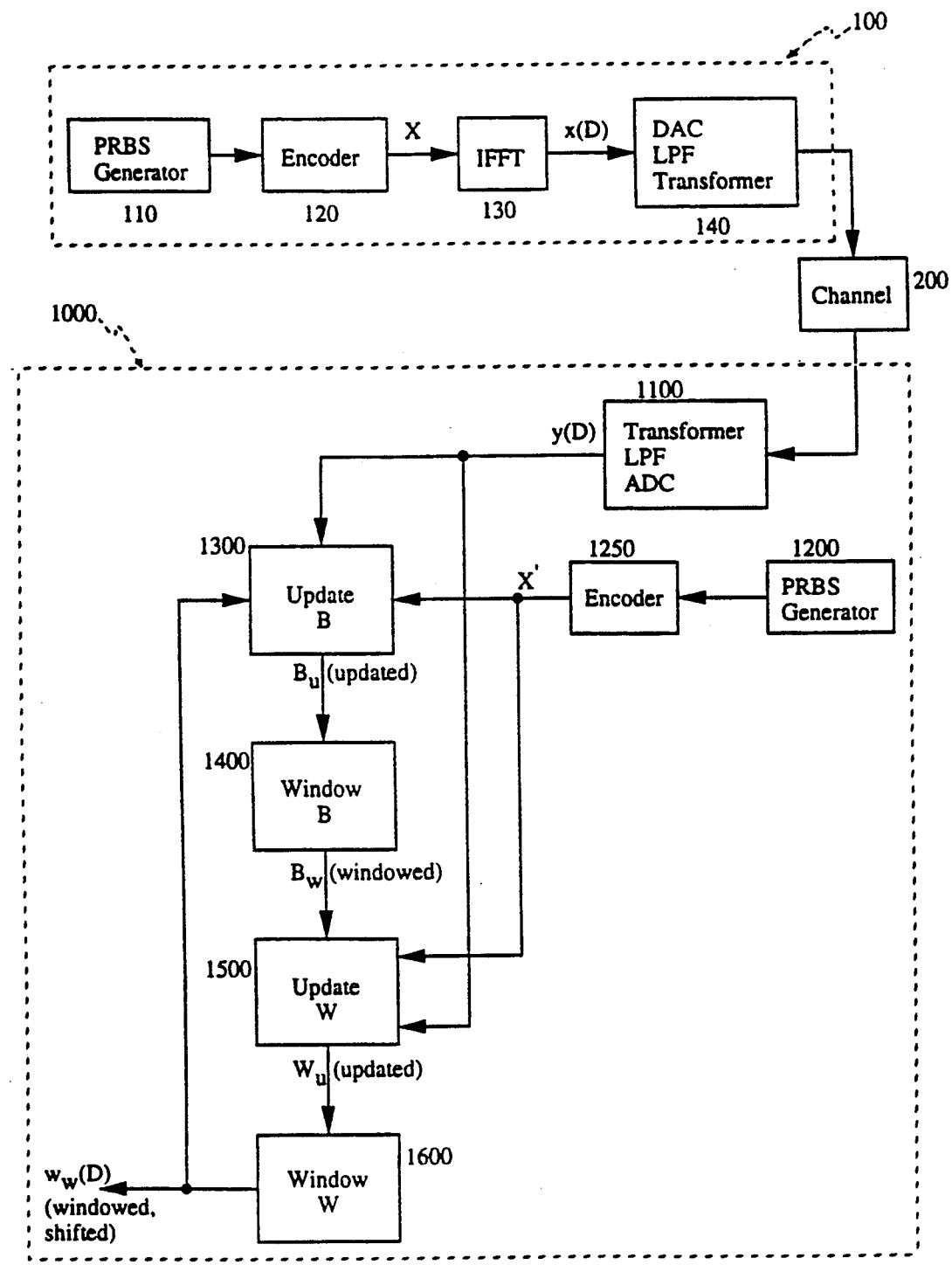
FIG. 6 is a block diagram depicting a method of training a receiver pre-equalizer for use in a multicarrier communication system.

Referring now to FIG. 6, a block diagram depicting a method of training a receiver pre-equalizer for use in a multicarrier communication system is shown. In a multicarrier transmitter 100, a fixed-length pseudo-random bit sequence (PRBS) of serial data, denoted as X, is generated by a PRBS Generator 110 and repeatedly transmitted through an encoder 120, an IFFT 130 and a DAC/LPF/transformer 140. The encoder 120 groups the serial data into blocks, converts the data into parallel form, and encodes the data. A standard Inverse Fast Fourier Transform (IFFT) 130 is then performed on the data, and the resulting samples are then sent to the DAC/LPF/transformer 140. The data is converted to analog by a digital-to-analog converter, passed through a low-pass filter, and sent through a d.c.-isolating transformer. The analog output of the transmitter is then sent through a distorting channel 200, and then sent through the transformer/LPF/ADC 1100 of a multicarrier receiver 1000, which performs dc-isolation, low-pass filtering, and conversion to digital to produce a received signal y(D). A replica of the PRBS, denoted as X', is simultaneously produced by the receiver's PRBS Generator 1200 and encoded by the receiver's encoder 1250. The received signal y(D) and the replica PRBS signal X' are used to "train" the equalizer by simultaneously adapting the parameters of a equalizer (W or w(D)) and a channel target (B or b(D)), which are each implemented as Finite Impulse Response (FIR) filters. In the following descriptions, the subscript "u" refers to an updated quantity, while the subscript "w" refers to a windowed quantity.

First, the windowed parameters of the equalizer $w_w(D)$ and the windowed channel target response parameters $B_w$ are initialized to reasonable initial values. Then, a loop of steps is repeated until a predetermined convergence condition is reached. The steps of the loop are:

- the Update B block 1300 responds to y(D), X' and $w_w(D)$ to produce a new, updated $B_u$.
- the Window B block 1400 windows $B_u$ by converting it to the time domain, selecting a fixed number of consecutive time-domain samples and zeroing the rest, and converting the result back to the frequency domain to produce $B_w$.
- the Update W block 1500 responds to y(D), X' and B (D) to produce a new, updated $W_u$.
- the Window W block 1600 windows $W_u$ by converting it to the time domain, selecting a fixed number of consecutive time-domain samples and zeroing the rest to produce $w_w(D)$.

Generally, this loop is repeated either until the error ($B_wX'-W_wH$) falls below a predetermined threshold, or the loop is repeated for a fixed length of time. However, it is clear that other known methods of determining convergence might be used.

Figure 1:
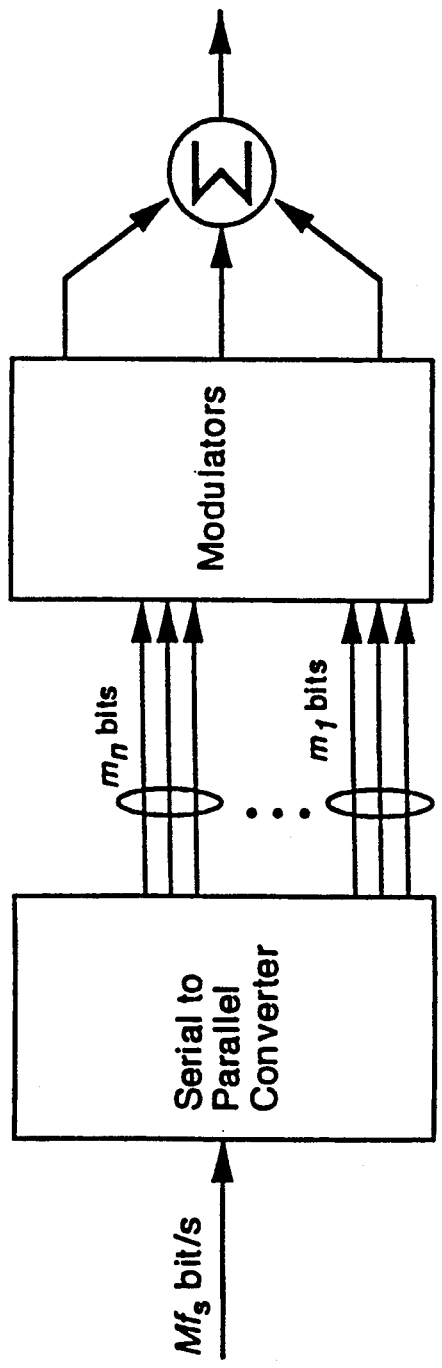
FIG. 1 is a generalized block diagram illustrating a basic multicarrier transmitter.
Figure 2A:
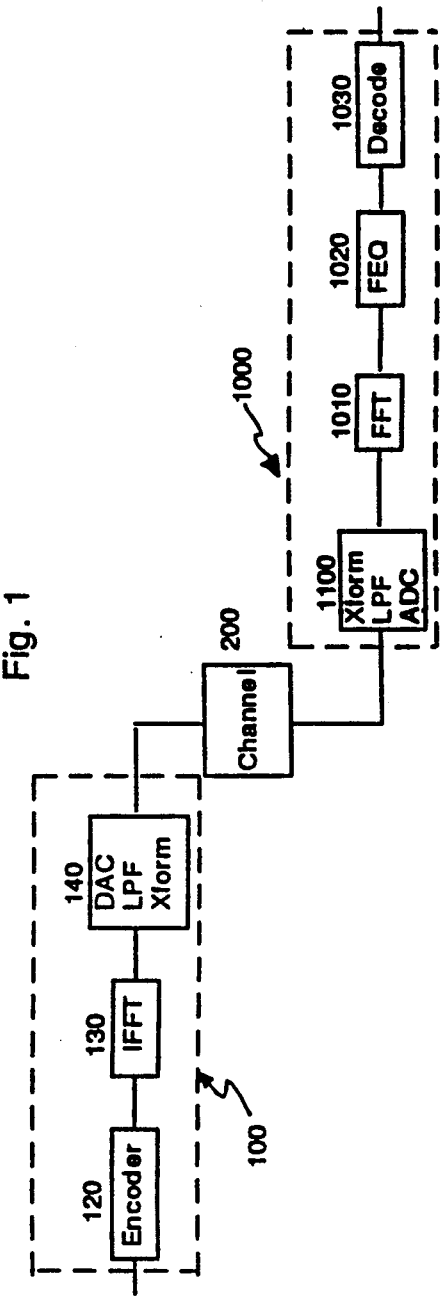
FIG. 2a is a block diagram illustrating a basic transmitter, communication channel and receiver.
Figure 2B:
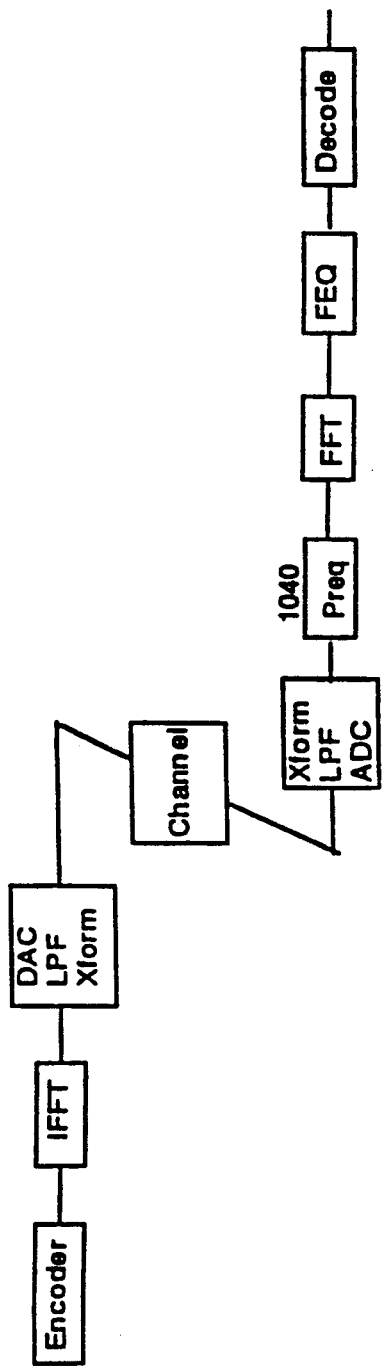
FIG. 2b is a block diagram generally illustrating a transmitter, transmission channel and receiver with pre-equalizer.
Figure 2C:
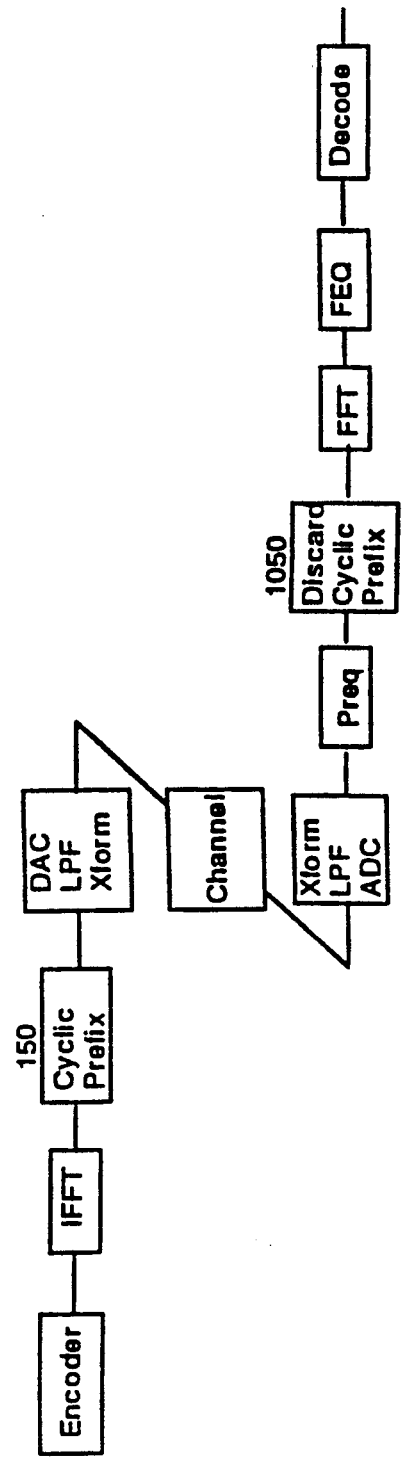
FIG. 2c is a block diagram illustrating a transmitter with cyclic prefix, transmission channel and receiver with pre-equalizer, and means for discarding the cyclic prefix.
Figure 3:
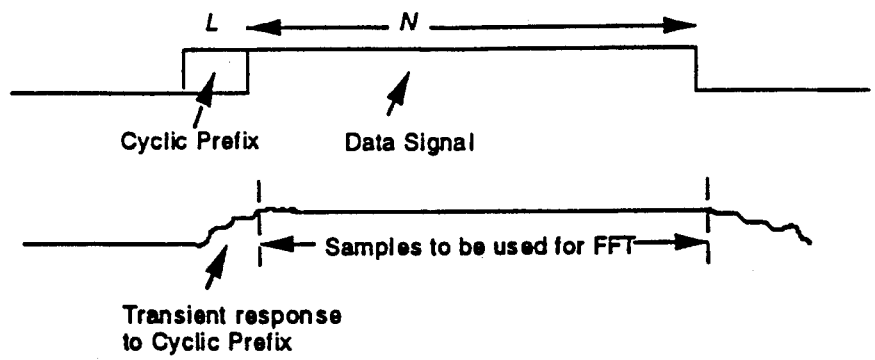
FIG. 3 is a diagram illustrating use of cyclic prefix to postpone collection of samples for an FFT.
Figure 4:
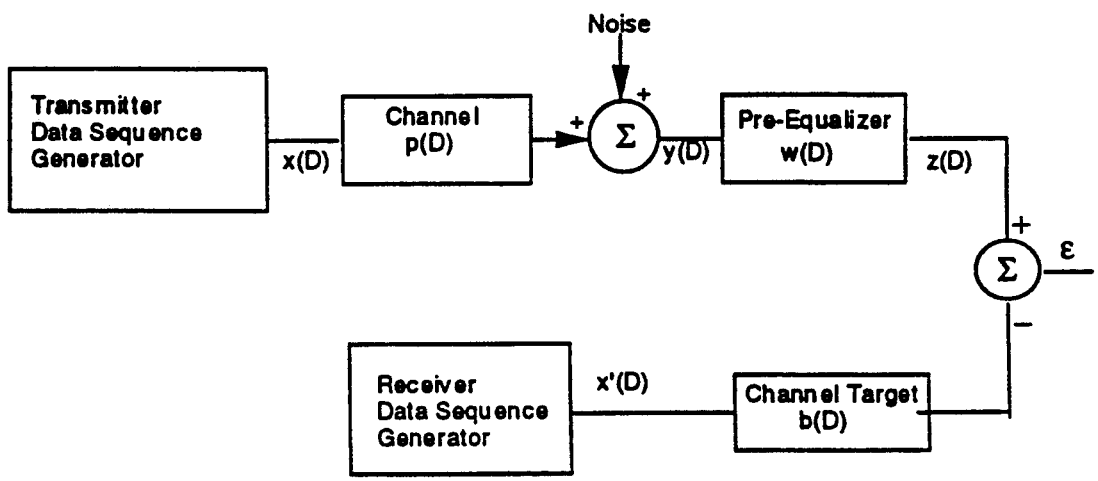
FIG. 4 is a block diagram showing pre-equalizer and channel target responses which are to be simultaneously adapted.
Figure 5:
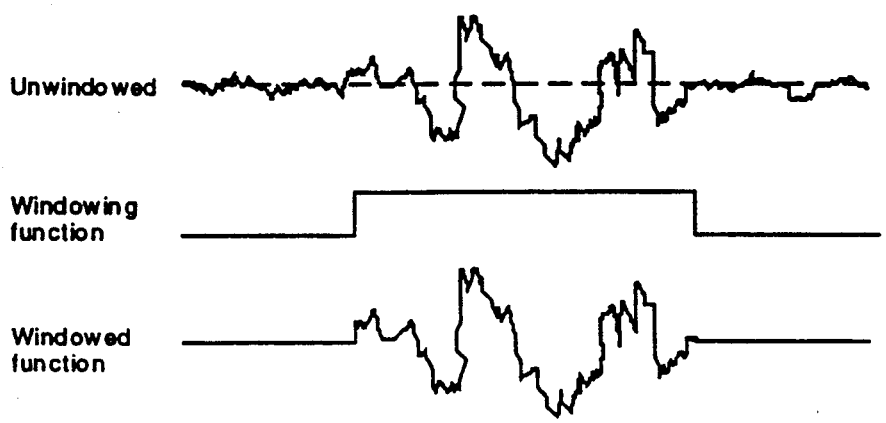
FIG. 5 is a diagram illustrating windowing operations.

As shown in FIG. 4, the error during the training process is the difference between the output of the pre-equalizer, denoted as w(D) * y(D), and the output of the channel target, which is denoted as b(D) * x'(D). Thus, the goal of the training process is to reduce the error to zero, or, equivalently, to produce the condition where $$w(D) * y(D) = b(D) * x'(D)$$

In the frequency domain, this is represented as $$W\,Y = B\,X'$$

Figure 7:
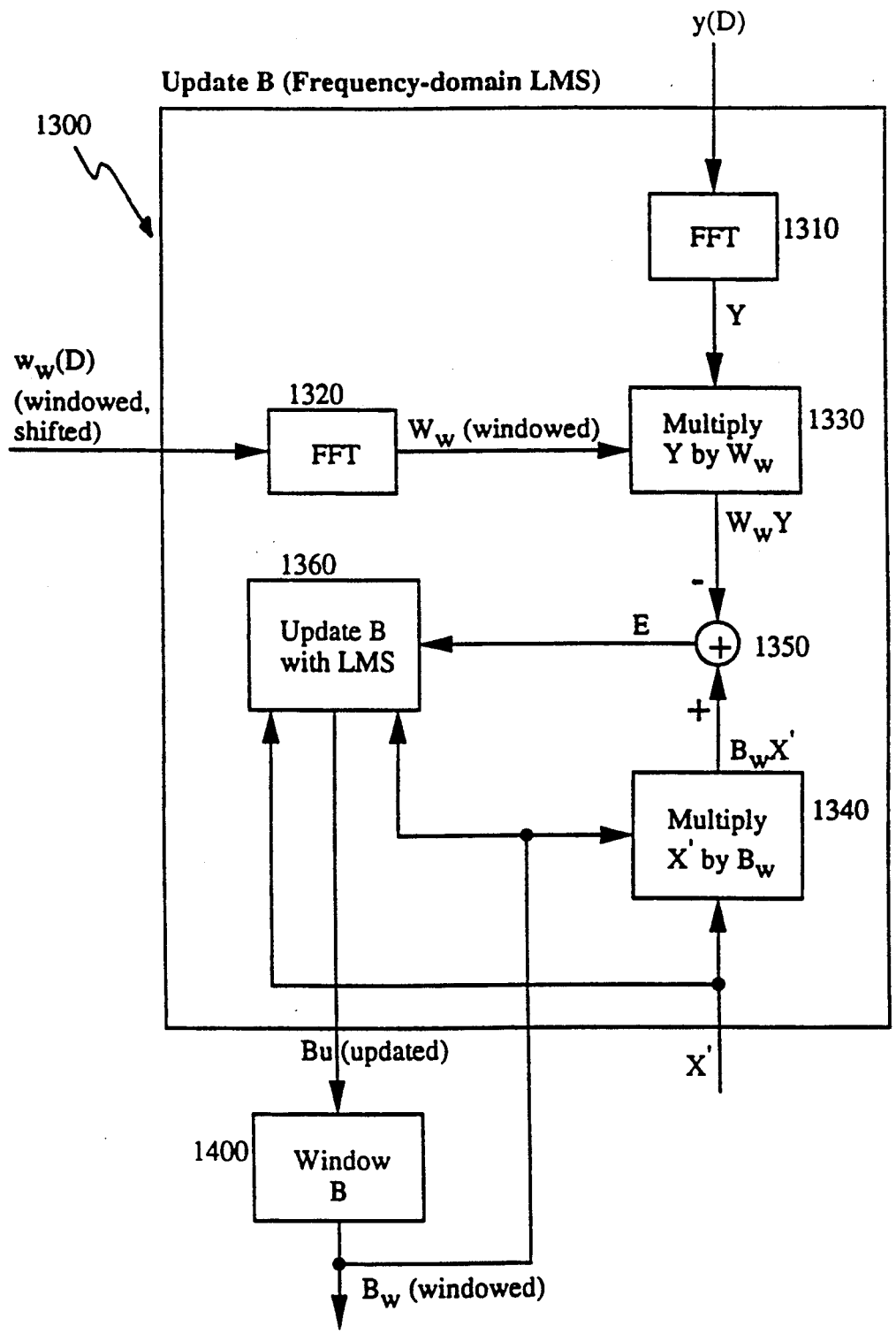
FIG. 7 illustrates a detailed block diagram showing one method of updating a channel target B, referred to as the frequency-domain LMS method.
Figure 8:
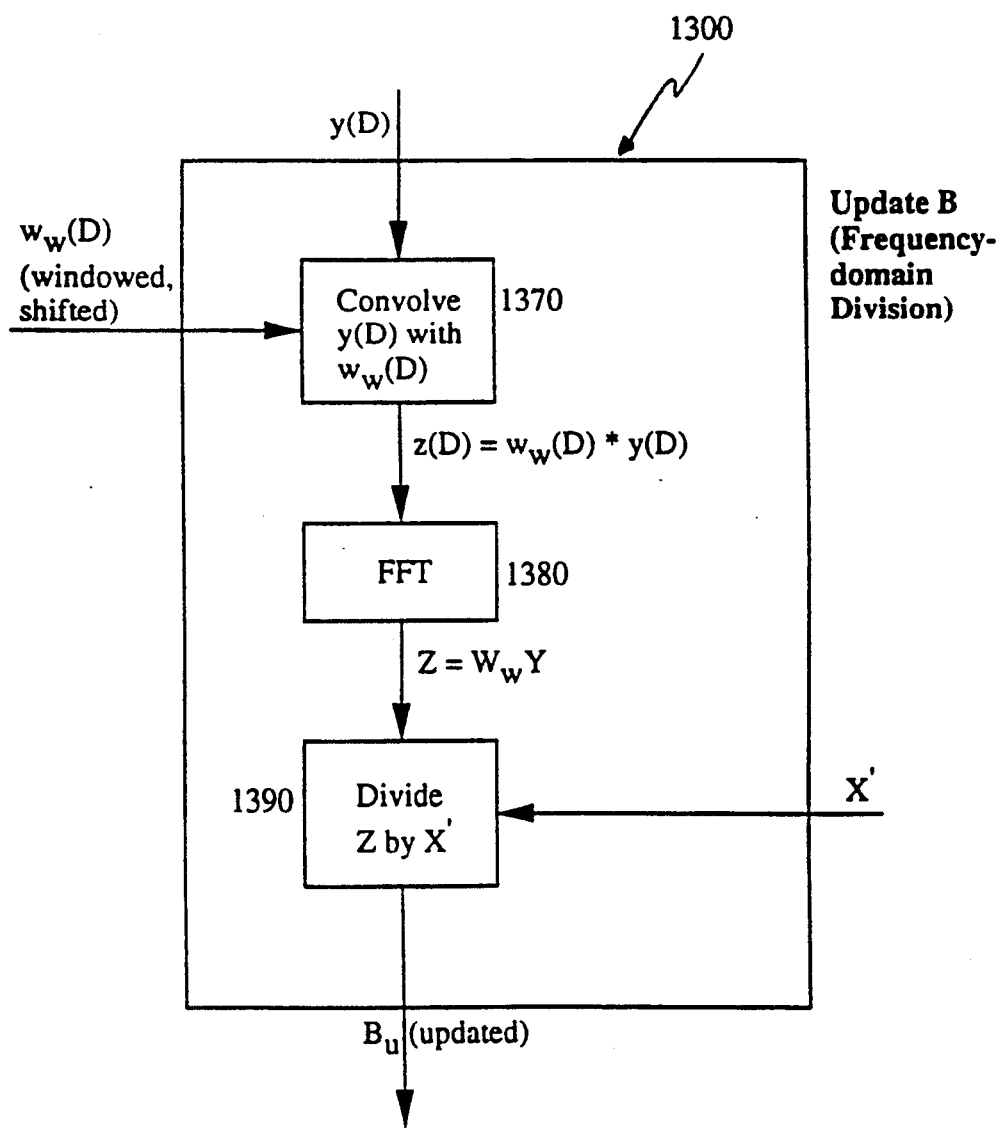
FIG. 8 is a block diagram illustrating an alternative method for updating the channel target B, referred to as the frequency-domain division method.

The updating of both the channel target B and the equalizer W utilize this equation. In FIG. 7, one method of updating B is shown, in which B is updated by producing an error signal $$E = BX' - WY$$

and adapting to drive E to zero. In FIG. 8, another method of updating B is shown, in which the updated B is produced by computing $$B = WY/X'$$

Figure 10:
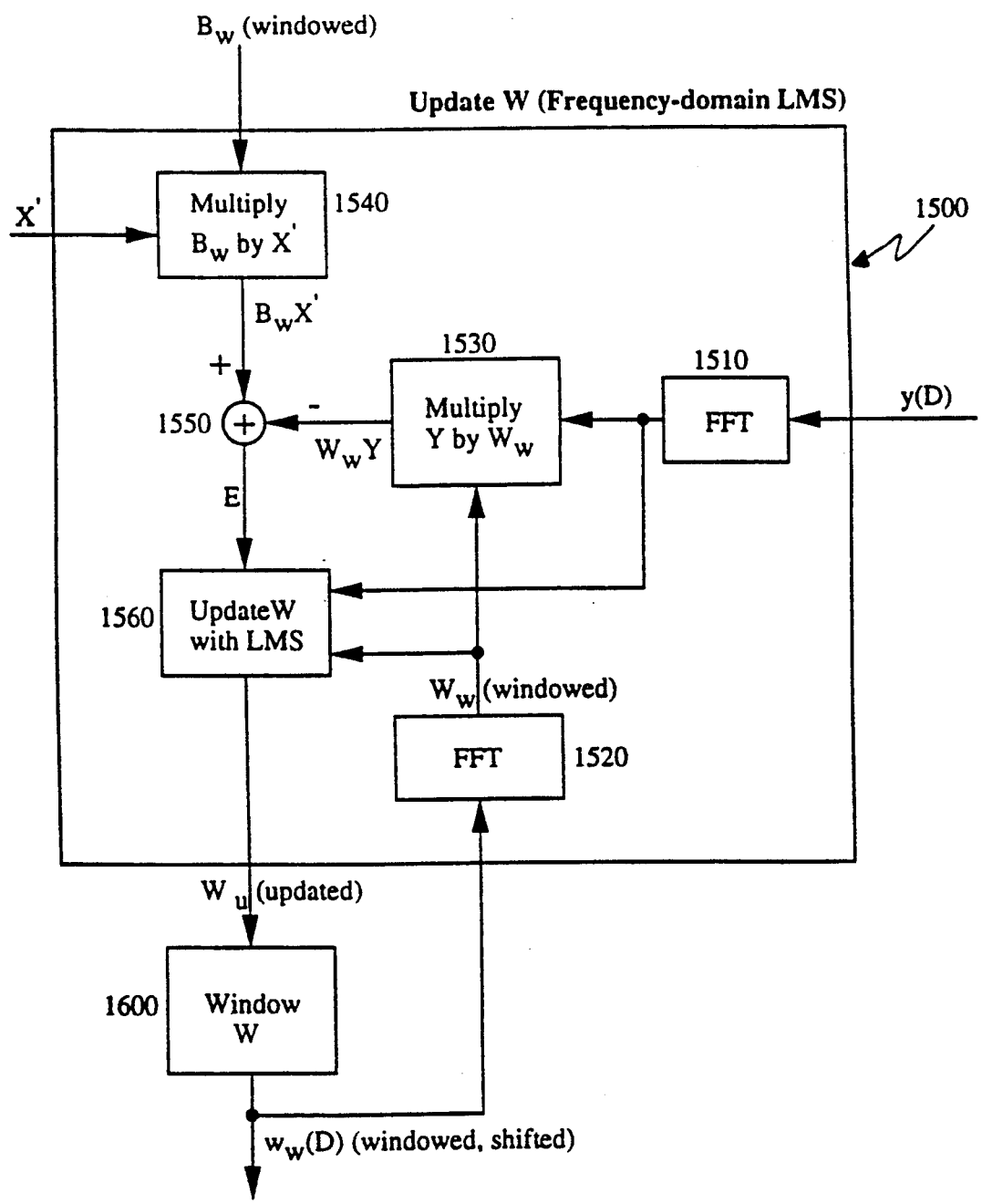
FIGS. 10, 11 and 12 respectively depict methods for updating and windowing the equalizer parameters W.
Figure 11:
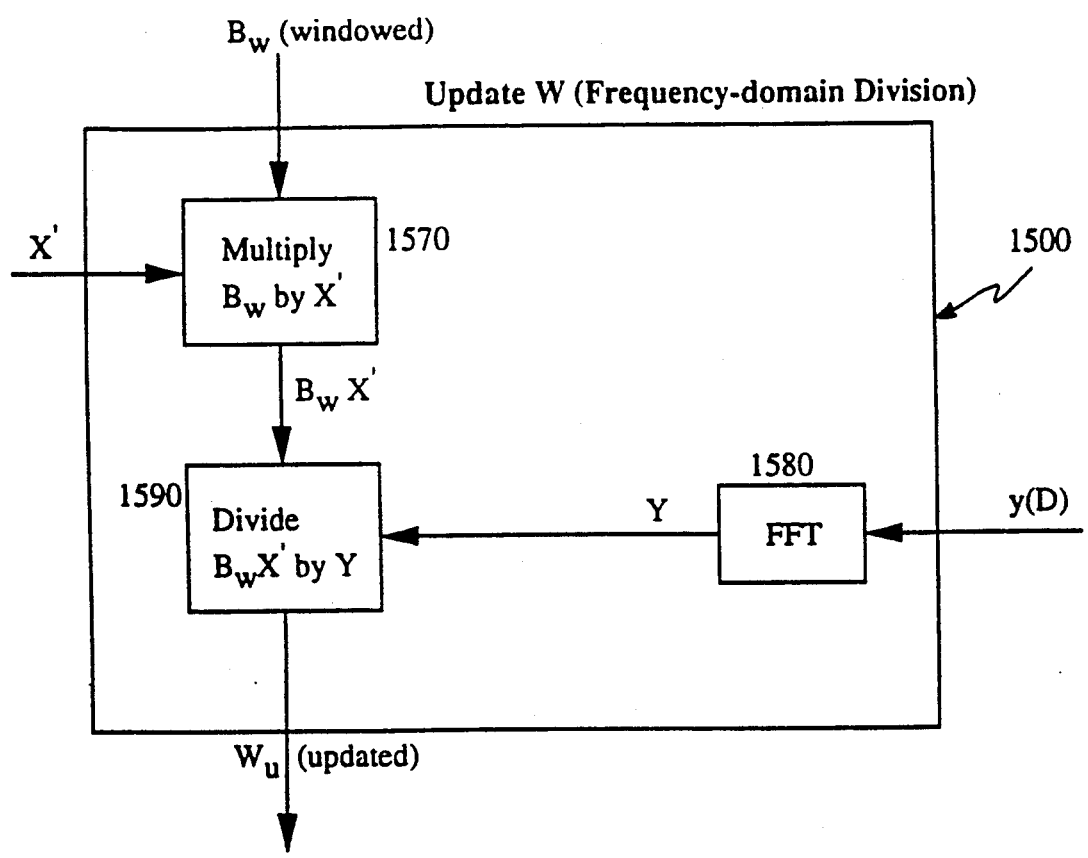

W is updated in FIG. 10 in a manner analogous to FIG. 7, and in FIG. 11 the updated W is produced by computing $$W = BX'/Y$$

FIG. 7 illustrates a detailed block diagram showing one method for updating the channel target B, which will be referred to as the frequency-domain LMS method. This figure represents an expanded view of the Update B block 1300 of FIG. 6. The received signal y(D) is passed through FFT 1310 to produce Y, and $w_w(D)$ is passed through FFT 1320 to produce $W_w$. These two quantities are then multiplied by a block multiplier 1330, to produce $W_wY$. Simultaneously, a block multiplier 1340 multiplies the encoded replica PRBS X' by the windowed channel target $B_w$ (which is produced by the Window B block 1400) to produce $B_wX'$. An error signal E is then computed by subtracting $W_wY$ from $B_wX'$ using the subtractor 1350. A standard LMS routine 1360 is then applied to E, $B_w$ and X', according to the formula $$B_u = B_w + \mu E X^*$$

(where $\mu$ is the stepsize and X is the complex conjugate of X') to produce an updated channel target $B_u$.

FIG. 8 illustrates a detailed block diagram showing an alternative method for updating the channel target B, which will be referred to as the frequency-domain division method. This figure represents an expanded view of the Update B block 1300 of FIG. 6. The received signal y(D) is convolved (filtered) with $w_w(D)$ to produce the equalized response z(D). This signal is then passed through an FFT 1380 to produce Z. The divider 1390 divides the equalized response Z by the encoded replica PRBS X' to produce the updated channel target $B_u$.

Figure 9:
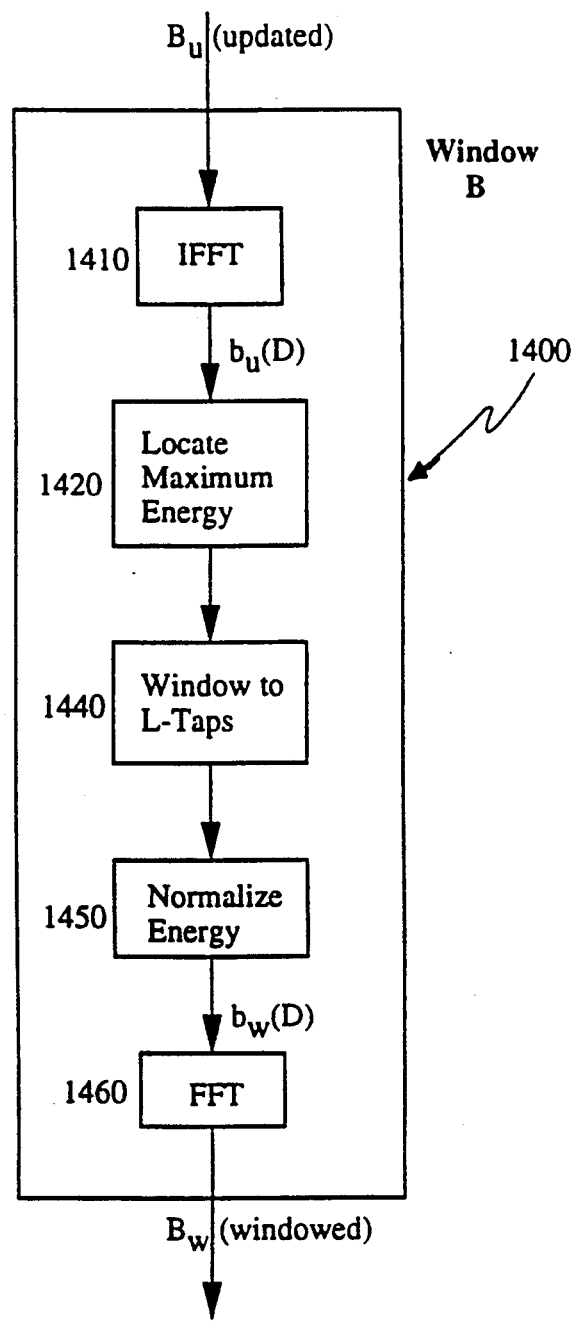
FIG. 9 is a block diagram illustrating a method for windowing the updated channel target $B_u$.

FIG. 9 illustrates a detailed block diagram showing a method for windowing the updated channel target $B_u$. This figure represents an expanded view of the Window B block 1400 of FIG. 6. The updated channel target is passed through an IFFT block 1410, producing $b_u(D)$. The Locate Maximum Energy block 1420, by treating $b_u(D)$ as a circular buffer, computes the total energy of each group of L consecutive taps (where L, the window size, is predetermined and fixed), and the group of L taps with the maximum energy is found. The windowing block 1440 then sets all remaining taps (those "outside the window") to zero. The normalization block 1450 normalizes the windowed function to prevent the training from drifting to the all-zero (b(D)=w(D)=0) solution. The output of this block is $b_w(D)$. This signal is then passed through FFT 1460 to produce $B_w$.

Figure 12:
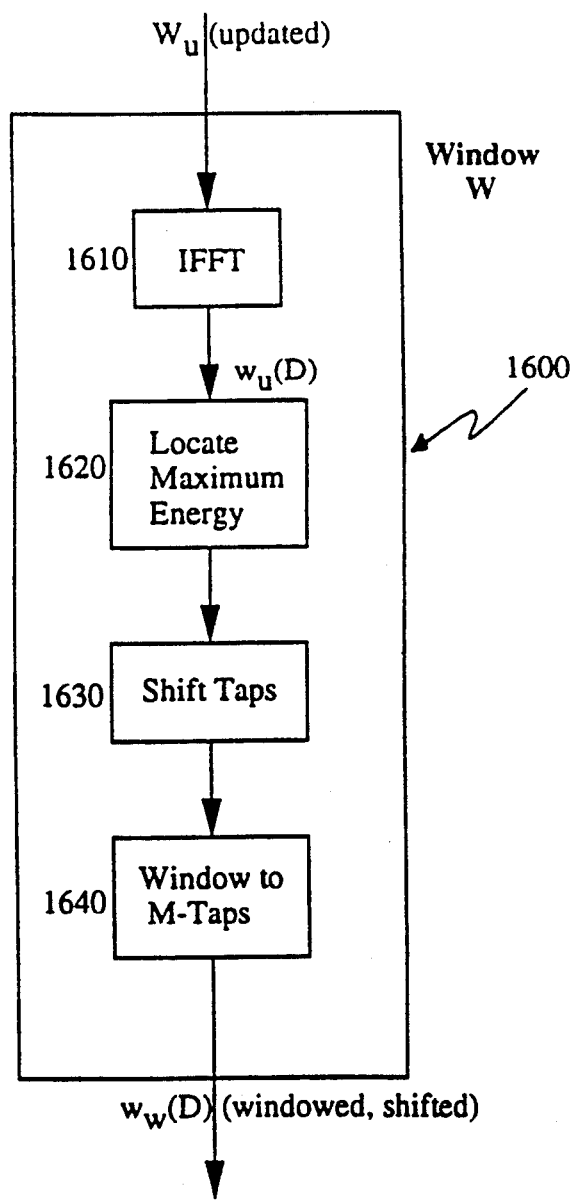

FIGS. 10, 11 and 12 depict detailed methods for updating and windowing the equalizer parameters W, which are very similar to the above-described methods for updating and windowing B.

FIG. 10 illustrates a detailed block diagram showing one method for updating the equalizer W, which will be referred to as the frequency-domain LMS method. This figure represents an expanded view of the Update W block 1500 of FIG. 6. The received signal y(D) is passed through FFT 1510 to produce Y, and $w_w$(D) is passed through FFT 1520 to produce $W_w$. These two quantities are then multiplied by a block multiplier 1530, to produce $W_w Y$. Simultaneously, a block multiplier 1540 multiplies the encoded replica PRBS X' by the windowed channel target $B_w$ to produce $B_w X'$. An error signal E is then computed by subtracting $W_w Y$ from $B_w X'$ using the subtractor 1550. A standard LMS routine 1560 is then applied to E, W and X', according to the formula $$W_u = W_w + \mu E X^*$$

(where $\mu$ is the stepsize and $X^*$ is the complex conjugate of X') to produce an updated equalizer $W_u$.

FIG. 11 illustrates a detailed block diagram showing an alternative method for updating the equalizer W, which will be referred to as the frequency-domain division method. This figure represents an expanded view of the Update W block 1500 of FIG. 6. Block multiplier 1570 is used to multiply the windowed channel target $B_w$ by the encoded replica PRBS X' to produce $B_w X'$, which is also designated as V. The received signal y(D) is passed through FFT 1580 to produce Y. The divider 1590 divides $B_w X'$ by Y to produce the updated equalizer $W_u$.

FIG. 12 illustrates a detailed block diagram showing a method for windowing the updated equalizer $W_u$. This figure represents an expanded view of the Window W block 1600 of FIG. 6. The updated equalizer is passed through an IFFT block 1610, producing $w_u$(D). The Locate Maximum Energy block 1620, by treating $w_u$(D) as a circular buffer, computes the total energy of each group of M consecutive taps (where M, the window size, is predetermined and fixed), and the group of M taps with the maximum energy is found. The Shift Taps block 1630 shifts the M consecutive taps "in the window" to the beginning of the buffer. The windowing block 1640 then sets all remaining taps (those "outside the window") to zero. The output of this block is $w_w$(D), the windowed and shifted parameters of the equalizer.

Figure 13A:
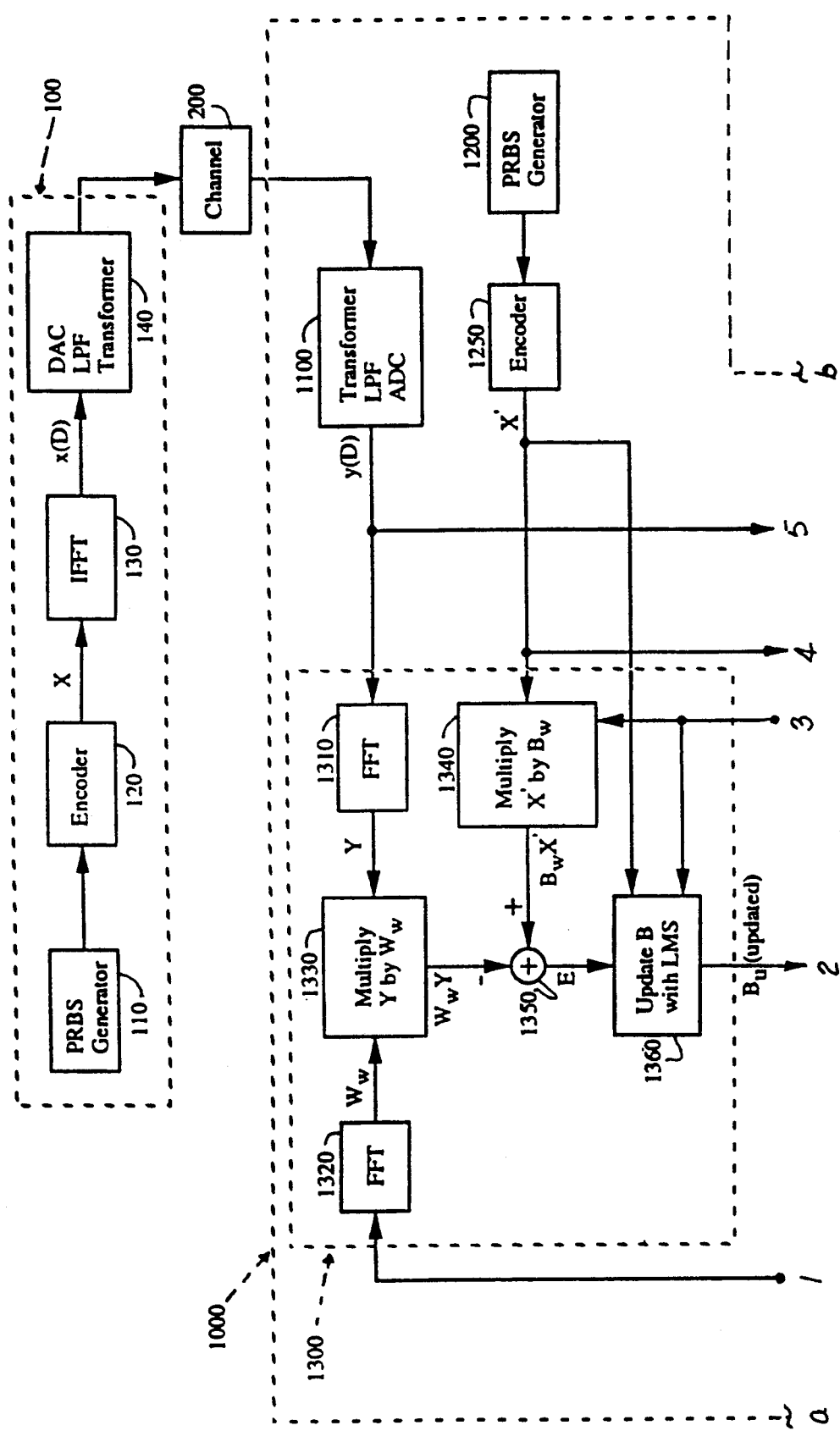
FIGS. 13–16 are expanded block diagrams showing embodiments of complete training methods based upon the previously illustrated training methods, windowing methods and alternative updating methods.
Figure 13B:
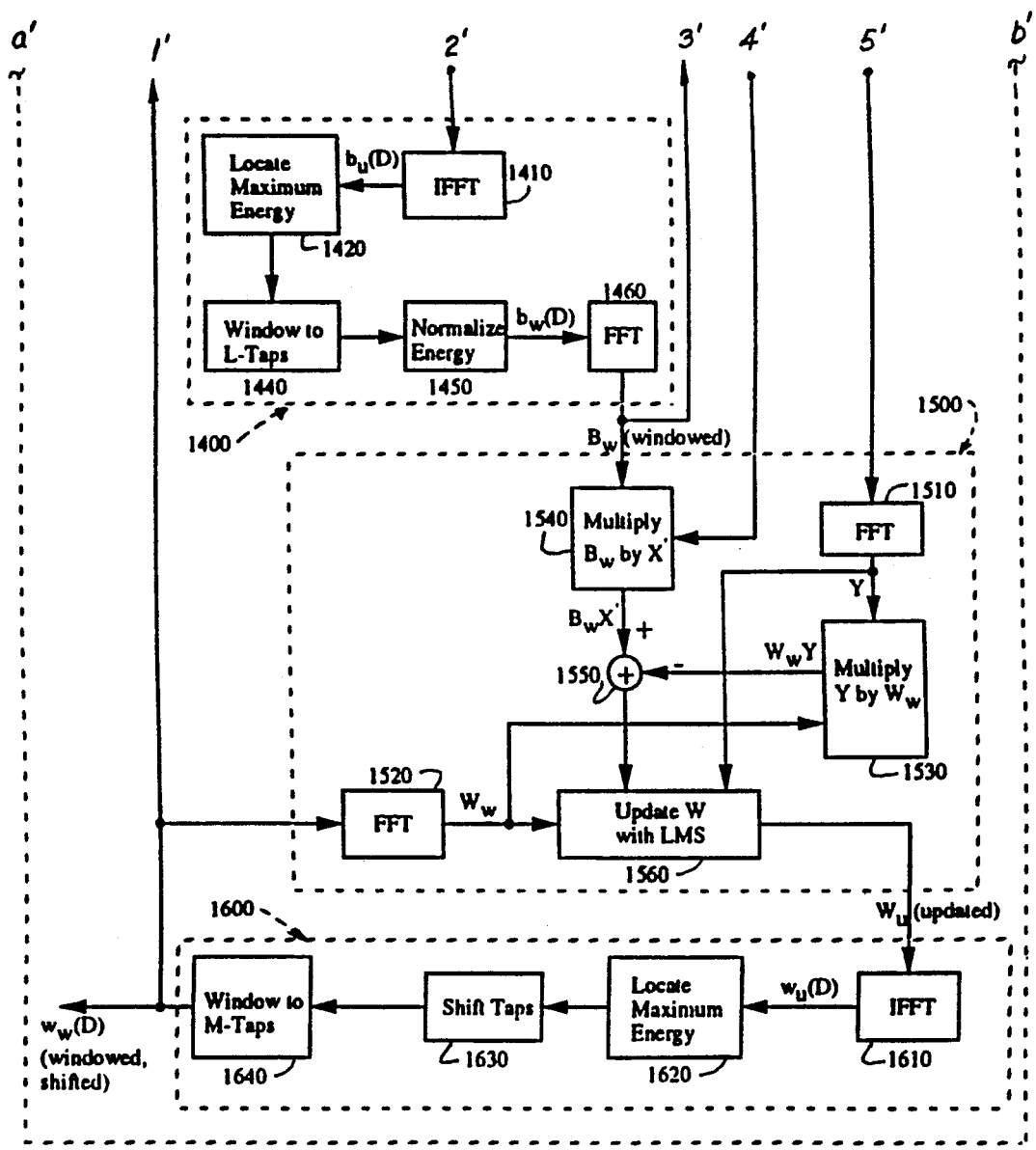
Figure 14A:
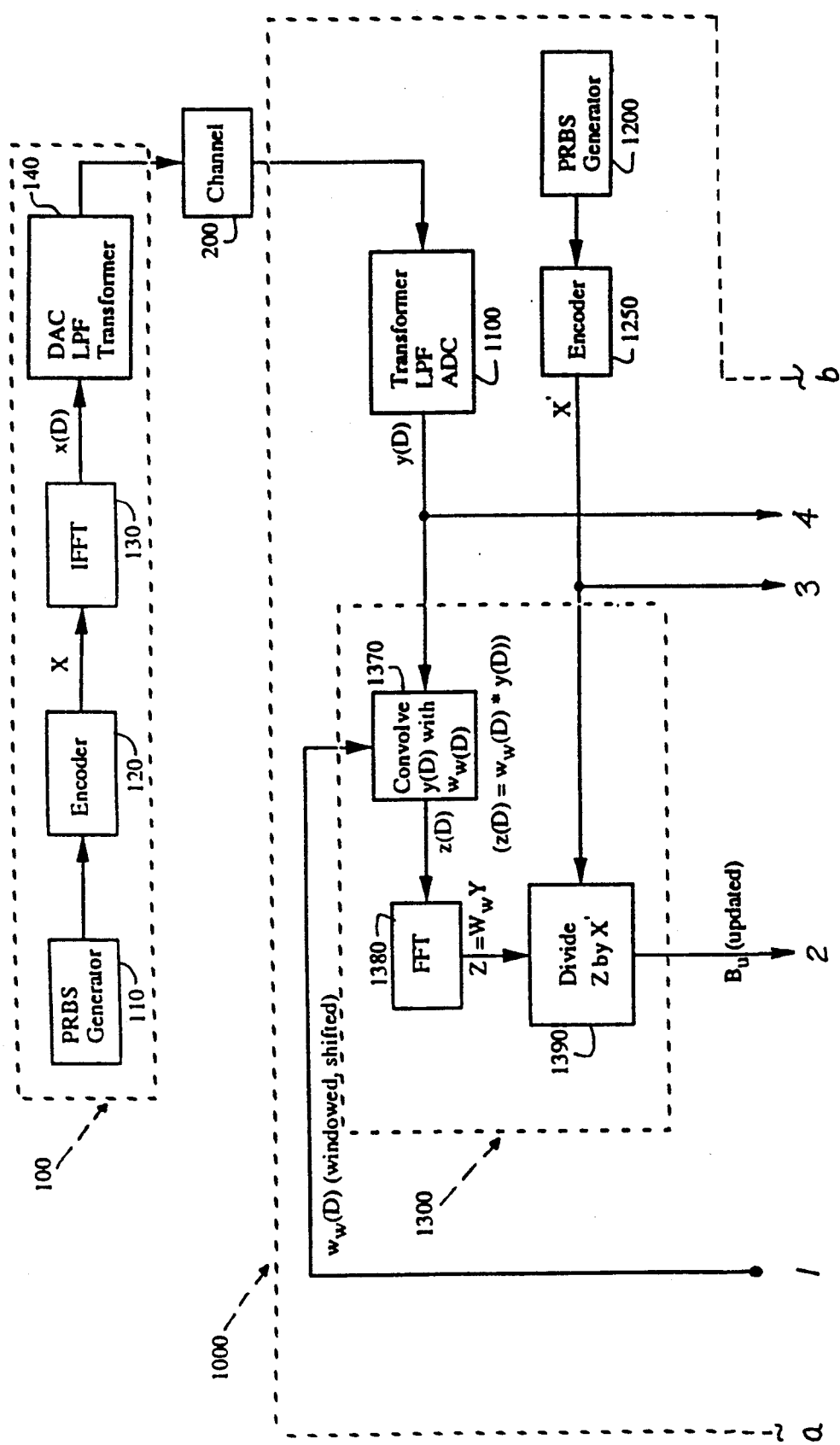
Figure 14:
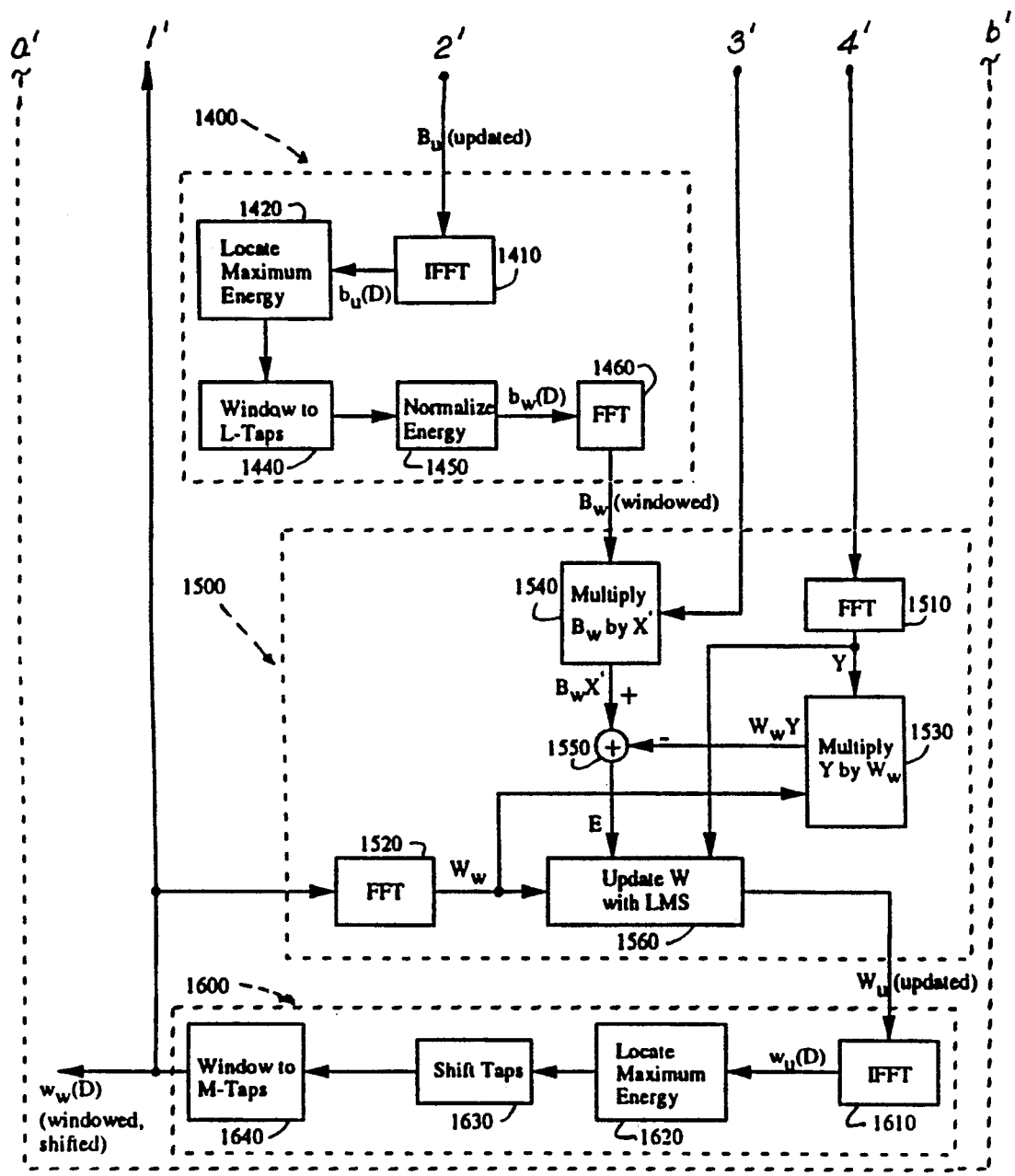
Figure 15A:
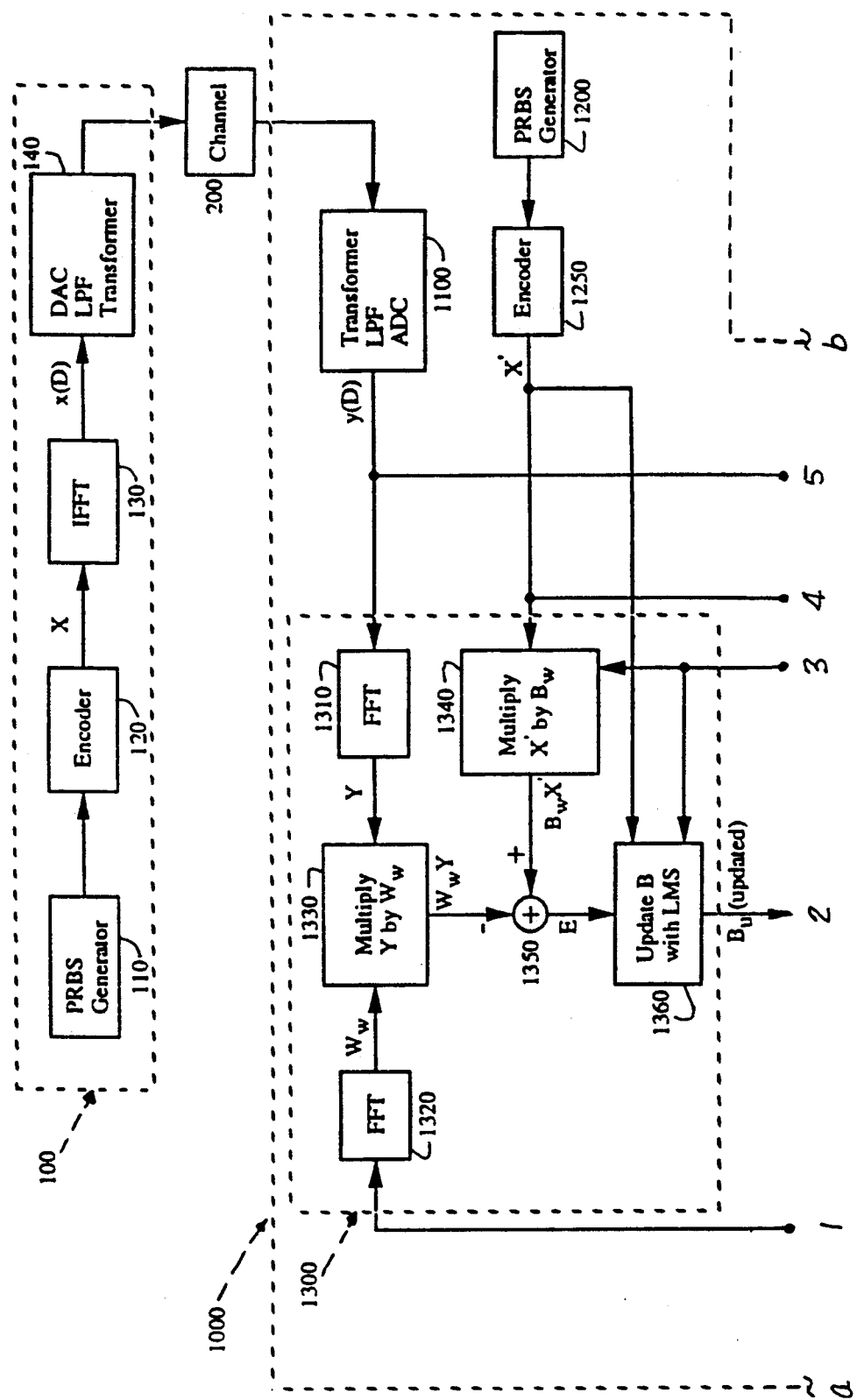
Figure 15:
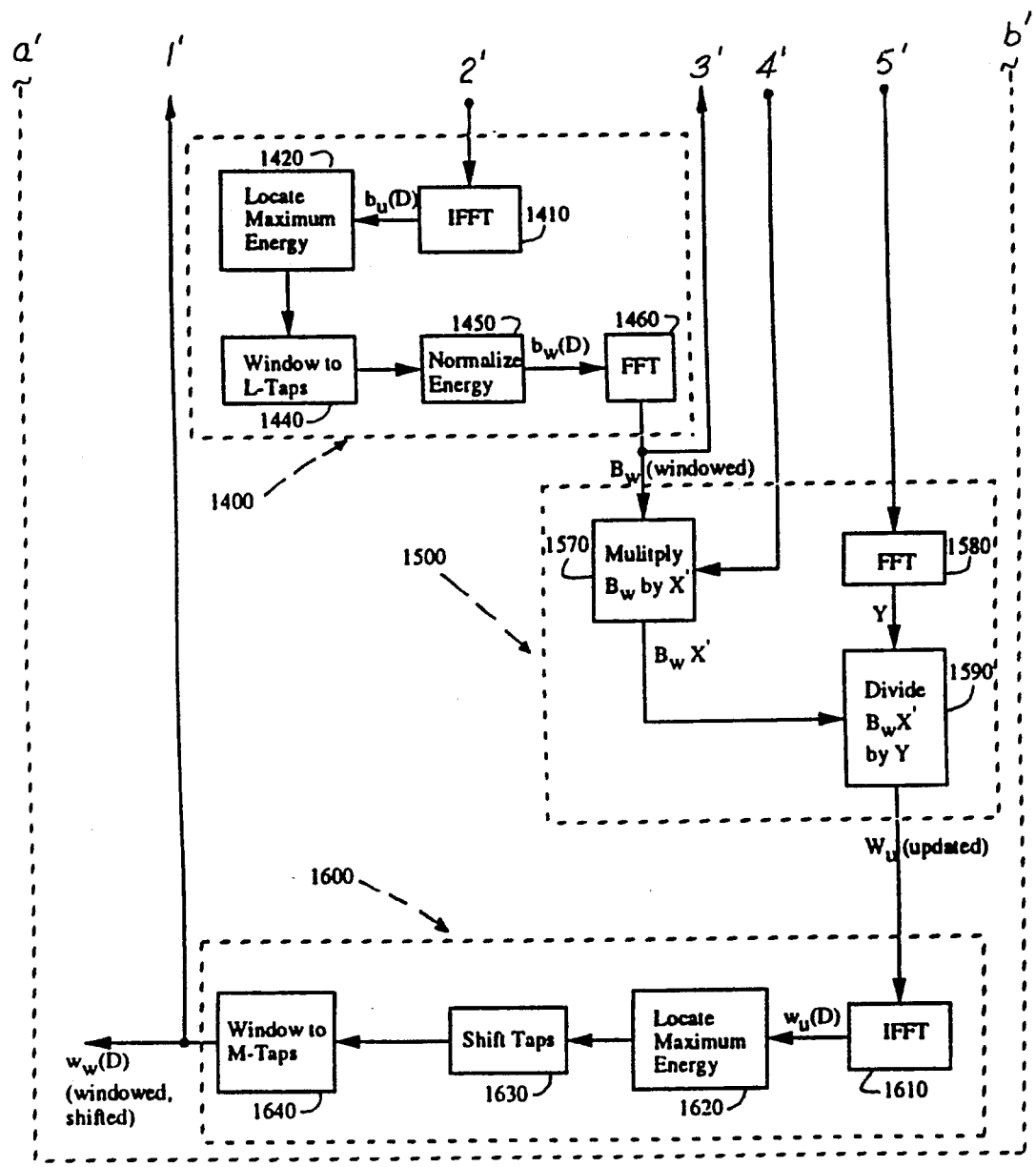
Figure 16A:
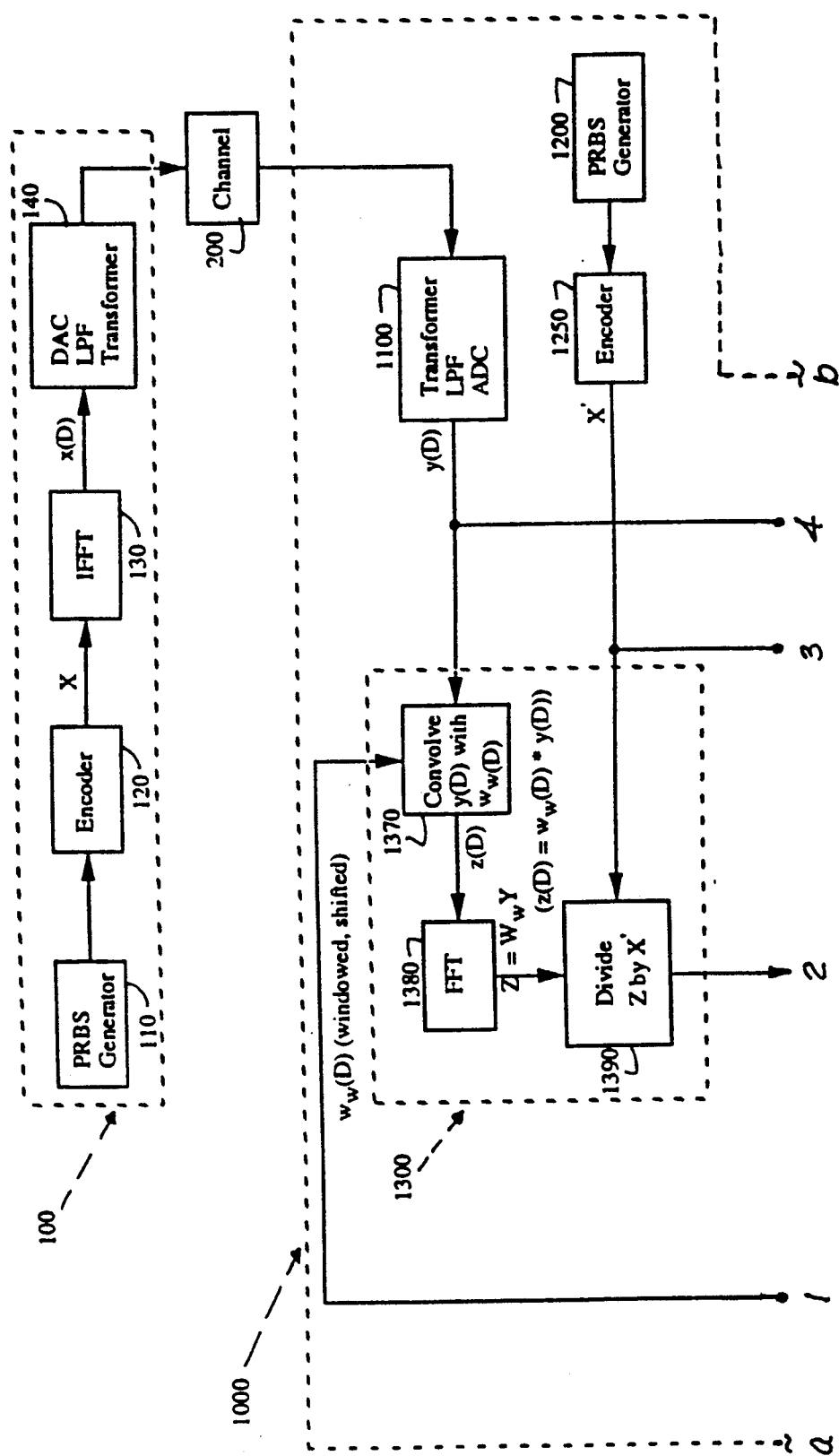
Figure 16B:
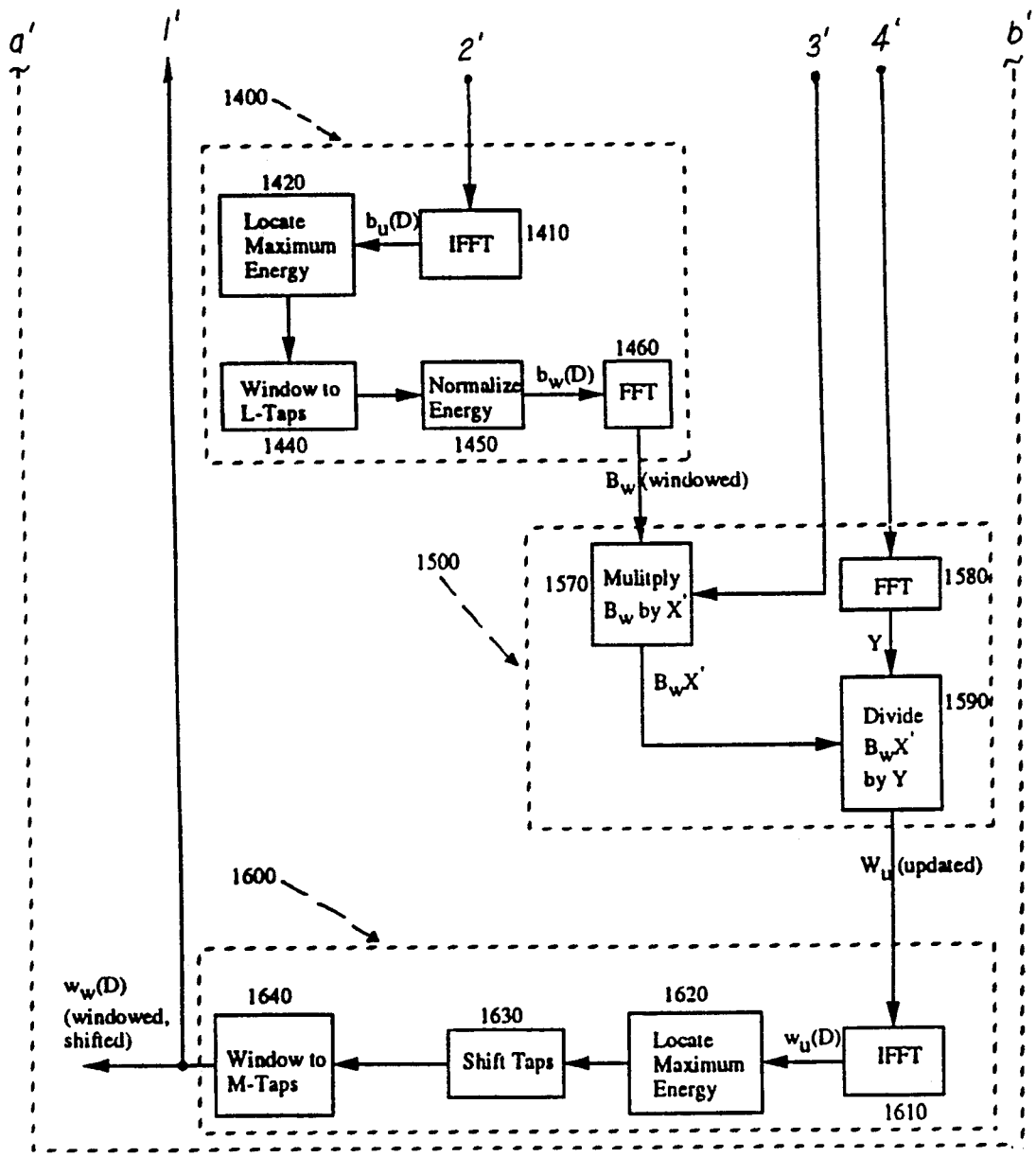

FIGS. 13 through 16 are expanded block diagrams of complete training method embodiments based upon the basic training method of FIG. 6, using the windowing methods of FIGS. 9 and 12 and the alternative updating methods of FIGS. 7, 8, 10 and 11. FIG. 13 incorporates the LMS method of updating B from FIG. 7, and the LMS method of updating W from FIG. 10. FIG. 14 utilizes the division method of updating B from FIG. 8, and the LMS method of updating W from FIG. 10. FIG. 15 employs the LMS method of updating B from FIG. 7, and the division method of updating W from FIG. 11. FIG. 16 embodies the division method of updating B from FIG. 8, and the division method of updating W from FIG. 11.

Figure 17:
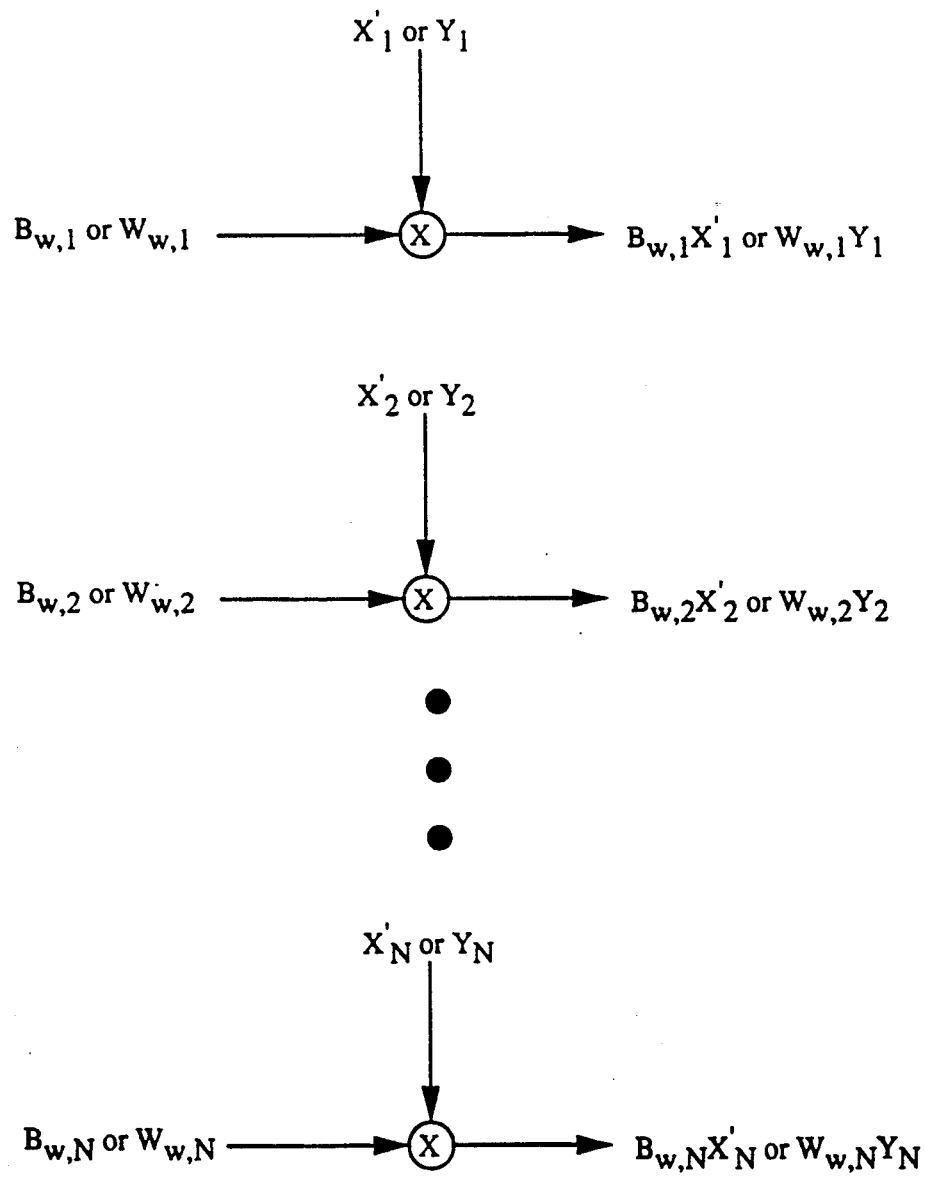
FIG. 17 is a schematic diagram intended to clarify the frequency-domain block multiplication operation.
Figure 18:
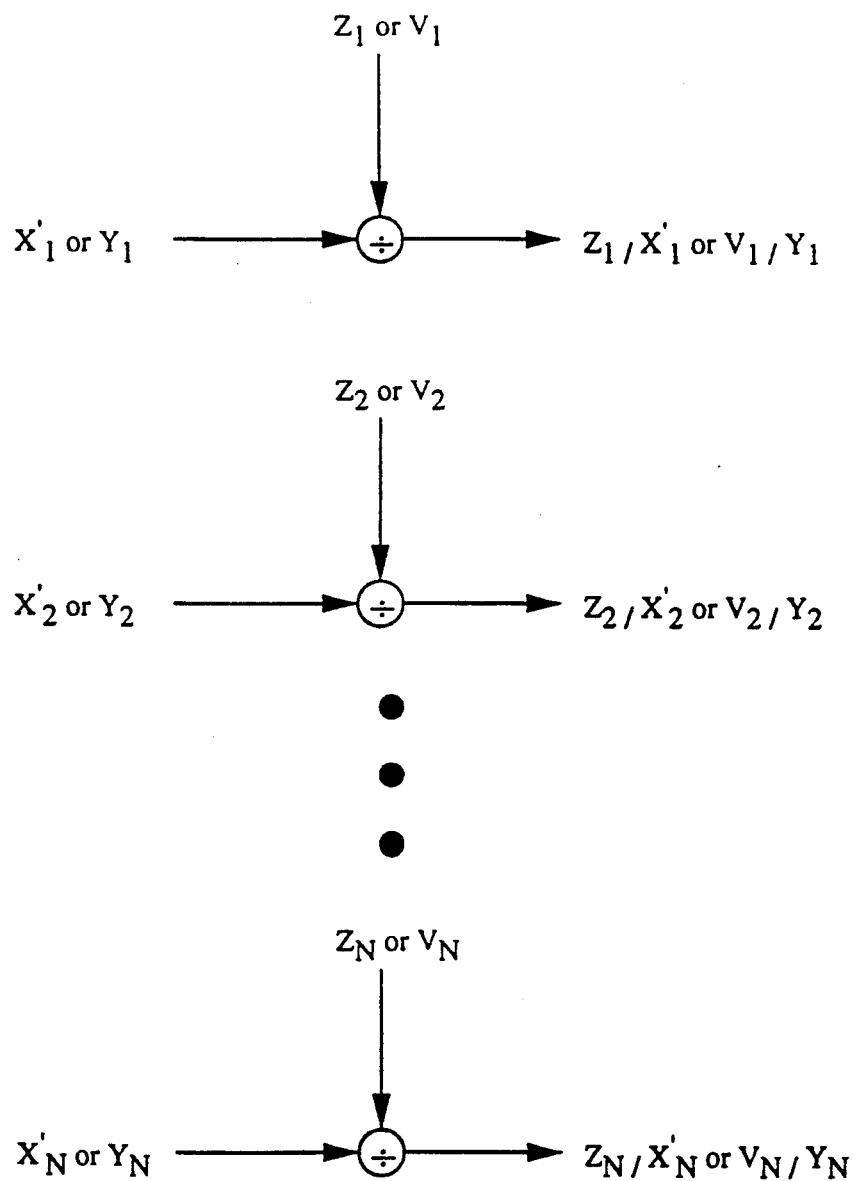
FIG. 18 is a schematic diagram illustrating the block division operations.

FIG. 17 is included to further explain and clarify the frequency-domain block multiplication operation used in blocks 1330, 1340, 1530, 1540 and 1570. The block multiplication consists of parallel multiplication operations on each of the corresponding parameters of the frequency domain sets of parameters: that is, to multiply B by X' to produce Z, the first parameter of B is multiplied by the first parameter of X' to produce the first parameter of Z ($B_{w,1} \times X'_1 = Z_1$). This process is performed in parallel for the first, the second, the third . . . through the nth parameters. FIG. 18 is a similar drawing included to explain the block division operations of blocks 1390 and 1590. Again, the block division operation consists of a parameter-by-parameter division which produces the corresponding parameter of the quotient.

Although the present invention has been described above in terms of preferred embodiments, it will be appreciated that various alterations and modifications thereof may become apparent to those of ordinary skill in the art For example, although the motivation for the invention was to shorten the impulse response of a severely distorting channel so as to allow the use of a short, efficient cyclic prefix appended to a multicarrier signal, it will be clear to those skilled in the art that the method could also be used as a solution to the problem described in the section on prior art; that is, shortening the impulse response to allow an economical implementation of MLSE or any other detection technique that requires a short channel response. One field in which this may be particularly useful is the field of magnetic storage, where the signal from the read head may be severely distorted by the storage medium.

In addition, the preferred embodiment describes the generation in the receiver of a local replica of the transmit signal; adaptation of the equalizers is termed "receiver reference-driven". It will be obvious to those skilled in the art that we might also use the decoded data to implement decision-driven adaption.

Further, it is well known to those skilled in the art that for cyclic signals the operations of convolution in the time-domain followed by transformation of the product into the frequency domain are equivalent to transformation of the two multiplicands into the frequency domain followed by complex multiplication, frequency component by frequency component. When, as a result of the addition of noise, the signals are not exactly cyclic, the two sequences of operations may not be exactly equivalent. The preferred embodiments described have used both sequences of operations in various sections; it will be clear to those skilled in the art that these sequences of operations may be substituted for each other with negligible difference in results.

Finally, as described in the background section, those skilled in the art will recognize that it is equivalent to append extra samples to the end of each transmitted block, forming a cyclic suffix, instead of a cyclic prefix.

It is therefore intended that the appended claims cover all such alterations and modifications as fall within the true spirit and scope of the invention.

What is claimed is:

1. In a data communication system comprising a multicarrier transmitter which encodes and modulates input data onto a plurality of carriers, generates n samples of a transmit signal, and then appends to the front of the block of N samples a cyclic prefix of L samples before transmitting all (N+L) samples, a channel which severely distorts signals input to it by the transmitter, and a multicarrier receiver which includes an equalizer which partially equalizes the distorted signals it receives from the channel, and means for removing the L samples of the cyclic prefix, and then demodulating and decoding the remaining N samples, a method of calculating a set of M windowed time-domain equalizer parameters $w_w(D)$ of said equalizer, wherein L, M and N are positive integers, said method comprising the steps of:

(a) initializing said windowed time-domain equalizer parameters $w_w(D)$ and a set of windowed frequency-domain channel target response parameters $B_w$ to some predetermined initial values, (b) calculating, in said transmitter, a set of N frequency domain samples of a repetitive multicarrier signal X, (c) encoding and transmitting said multicarrier signal X from said transmitter through said channel and into said receiver to produce a received signal y(D), (d) generating, in said receiver, a set of N frequency domain samples of a local replica X' of said repetitive multicarrier signal, (e) using said windowed time-domain equalizer parameters $w_w(D)$, the samples of said local replica X' and said received signal y(D) to update said frequency-domain channel target response parameters $B_u$, (f) transforming said frequency-domain channel target response parameters $B_u$ into the time domain to produce a set of time-domain channel target response parameters $b_u(D)$, (g) windowing said time-domain channel target response parameters $b_u(D)$ by selecting L consecutive samples of $b_u(D)$ to produce a set of windowed time-domain channel target response parameters $b_w(D)$, (h) transforming said windowed time-domain channel target response parameters $b_w(D)$ into the frequency domain to produce a set of windowed frequency-domain channel target response parameters $B_w$, (i) using said windowed frequency-domain channel target response parameters $B_w$, the samples of said local replica X' and said received signal y(D) to update a set of frequency-domain equalizer parameters $W_u$, (j) transforming said frequency-domain equalizer parameters $W_u$ into the time domain to produce a set of time-domain equalizer parameters $W_u(D)$, (k) windowing said time-domain equalizer parameters $w_u(D)$ by selecting M consecutive samples of $w_u(D)$ to produce a set of windowed time-domain equalizer parameters $w_w(D)$, and (l) repeating steps (c) through (k) until a predetermined convergence condition is determined.

2. The method of claim 1, in which step (e), the step of updating the frequency-domain channel target response parameters $B_u$, comprises the steps of:

(e1) transforming the samples of said received signal y(D) into the frequency domain to produce a frequency domain received signal Y, (e2) transforming the windowed time-domain equalizer parameters $w_w(D)$ to frequency domain to produce a set of windowed frequency-domain equalizer parameters $W_w$, (e3) multiplying said frequency-domain received signal Y by said windowed frequency-domain equalizer parameters $W_w$ to produce $W_wY$, (e4) multiplying said local replica X' by said windowed frequency-domain channel target response parameters $B_w$ to produce $B_wX'$, (e5) subtracting $W_wY$ of step (e3) from $B_wX'$ of step (e4) to produce a channel target response error E, and (e6) using said channel target response error E, the local replica X' and the windowed frequency-domain channel target response parameters B to correlate E and X' and perform a Least Mean Squares update of the frequency-domain channel target response parameters $B_u$.

3. The method of claim 1, in which step (e), the step of updating the frequency-domain channel target response parameters $B_u$, comprises the steps of:

(e1) performing a time-domain convolution on said received signal y(D) and the windowed time-domain equalizer parameters $w_w(D)$ to produce a time-domain equalized response z(D), (e2) transforming the time-domain equalized response to the frequency domain to produce a frequency-domain equalized response Z, and (e3) dividing the frequency-domain equalized response Z by the local replica X' to produce an updated frequency-domain channel target response parameters $B_u$.

4. The method of claim 1, 2 or 3 in which step (i), the step of updating the frequency-domain equalizer parameters $W_u$, comprises the steps of:

(i1) transforming the samples of said received signal y(D) into the frequency domain to produce a frequency domain received signal Y, (i2) transforming the windowed time-domain equalizer parameters $w_w(D)$ to frequency domain to produce a set of windowed frequency-domain equalizer parameters $W_w$, (i3) multiplying said frequency-domain received signal Y by said windowed frequency-domain equalizer parameters $W_w$ to produce $W_wY$, (i4) multiplying said local replica X' by the windowed frequency-domain channel target response parameters $B_w$ to produce $B_wX'$, (i5) subtracting $W_wY$ of step (i3) from $B_wX'$ of step (i4) to produce a equalizer error E, and (i6) using said equalizer error E, the frequency-domain received signal Y and the windowed frequency-domain equalizer parameters $W_w$ to correlate E and Y and perform a Least Mean Squares update of the frequency-domain equalizer parameters $W_u$.

5. The method of claim 1, 2 or 3 in which step (i), the step of updating the frequency-domain equalizer parameters $W_u$, comprises the steps of:

(i1) multiplying the windowed frequency-domain channel target response $B_w$ by the local replica X' to produce $B_wX'$, (i2) transforming the received signal y(D) to the frequency domain to produce a frequency-domain received signal Y, and (i3) dividing $B_wX'$ by the frequency-domain received signal Y to produce updated frequency-domain equalizer parameters $W_u$.

6. The method of any of claims 1, 2 or 3, wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) scaling each of the samples of $b_w(D)$ by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero.

7. The method of claim 4 wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) scaling each of the samples of $b_w(D)$ by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero.

8. The method of claim 5 wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) scaling each of the samples of $b_w(D)$ by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero 9. The method of any of claims 1, 2 or 3, wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) comparing the total energy of said channel target window group to a predetermined energy threshold, whereby when said total energy is less than said energy threshold, each of the samples of $b_w(D)$ is scaled by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero 10. The method of claim 4 wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) comparing the total energy of said channel target window group to a predetermined energy threshold, whereby when said total energy is less than said energy threshold, each of the samples of $b_w(D)$ is scaled by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero 11. The method of claim 5 wherein step (g), the step of windowing said time-domain channel target response parameters $b_u(D)$, comprises the steps of:

(g1) searching through all the samples of $b_u(D)$ to locate a channel target window group of L consecutive samples wherein said channel target window group has the largest total energy, (g2) copying the samples of said channel target window group to form $b_w(d)$ and setting all other samples of $b_w(D)$ to zero, and (g3) comparing the total energy of said channel target window group to a predetermined energy threshold, whereby when said total energy is less than said energy threshold, each of the samples of $b_w(D)$ is scaled by a normalizing factor so that the sum of the squares of the scaled samples equals a predetermined constant;

and wherein step (k), the step of windowing said time-domain equalizer parameters $w_u(D)$, comprises the steps of:

(k1) searching through all the samples of $w_u(D)$ to locate an equalizer window group of M consecutive samples wherein said equalizer window group has the largest total energy, (k2) copying the samples of said equalizer window group to form $w_w(d)$ and setting all other samples of $w_w(D)$ to zero 12. In a data transmission system including a transmitter, a distorting channel and a receiver, said receiver including an equalizer which processes a received signal before said signal is input to a demodulator, wherein said data transmission system requires that the impulse response of the received signal be shortened to L samples in the equalizer, a method of calculating a set of M windowed time-domain equalizer parameters $w_w(D)$ of said equalizer comprising the steps of:

(a) initializing said windowed time-domain equalizer parameters $w_w(D)$ and a set of windowed frequency-domain channel target response parameters $B_w$ to some predetermined initial values, (b) calculating, in said transmitter, a set of N frequency domain samples of a repetitive multicarrier signal X, (c) encoding and transmitting said multicarrier signal X from said transmitter through said channel and into said receiver to produce a received signal y(D), (d) generating, in said receiver, a set of N frequency domain samples of a local replica X' of said repetitive multicarrier signal, (e) using said windowed time-domain equalizer parameters $w_w(D)$, the samples of said local replica X' and said received signal y(D) to update said frequency-domain channel target response parameters $B_u$, (f) transforming said frequency-domain channel target response parameters $B_u$ into the time domain to produce a set of time-domain channel target response parameters $b_u(D)$, (g) windowing said time-domain channel target response parameters $b_u(D)$ by selecting L consecutive samples of $b_u(D)$ to produce a set of windowed time-domain channel target response parameters $b_w(D)$, (h) transforming said windowed time-domain channel target response parameters $b_w(D)$ into the frequency domain to produce a set of windowed frequency-domain channel target response parameters $B_w$, (i) using said windowed frequency-domain channel target response parameters $B_w$, the samples of said local replica X' and said received signal y(D) to update a set of frequency-domain equalizer parameters $W_u$, (j) transforming said frequency-domain equalizer parameters $W_u$ into the time domain to produce a set of time-domain equalizer parameters $w_u(D)$, (k) windowing said time-domain equalizer parameters $w_u(D)$ by selecting M consecutive samples of $w_u(D)$ to produce a set of windowed time-domain equalizer parameters $w_w(D)$, and (l) repeating steps (c) through (k) until a predetermined convergence condition is determined.

13. In a data storage system including a write mechanism, a distorting storage medium, a read mechanism, and a receiver which processes a received signal read from the storage medium by the read mechanism, said receiver including a decoder and an equalizer which processes said received signal before said signal is input to the decoder, wherein said data storage system requires that the impulse response of the received signal be shortened to L samples in the equalizer, a method of calculating a set of M windowed time-domain equalizer parameters $w_w(D)$ of said equalizer comprising the steps of:

(a) initializing said windowed time-domain equalizer parameters $w_w(D)$ and a set of windowed frequency-domain channel target response parameters $B_w$ to some predetermined initial values, (b) calculating, in said transmitter, a set of N frequency domain samples of a repetitive multicarrier signal X, (c) encoding and transmitting said multicarrier signal X from said transmitter through said channel and into said receiver to produce a received signal y(D), (d) generating, in said receiver, a set of N frequency domain samples of a local replica X' of said repetitive multicarrier signal, (e) using said windowed time-domain equalizer parameters $w_w(D)$, the samples of said local replica X' and said received signal y(D) to update said frequency-domain channel target response parameters $B_u$, (f) transforming said frequency-domain channel target response parameters $B_u$ into the time domain to produce a set of time-domain channel target response parameters $b_u(D)$, (g) windowing said time-domain channel target response parameters $b_u(D)$ by selecting L consecutive samples of $b_u(D)$ to produce a set of windowed time-domain channel target response parameters $b_w(D)$, (h) transforming said windowed time-domain channel target response parameters $b_w(D)$ into the frequency domain to produce a set of windowed frequency-domain channel target response parameters $B_w$, (i) using said windowed frequency-domain channel target response parameters $B_w$, the samples of said local replica X' and said received signal y(D) to update a set of frequency-domain equalizer parameters $W_u$, (j) transforming said frequency-domain equalizer parameters $W_u$ into the time domain to produce a set of time-domain equalizer parameters $w_u(D)$, (k) windowing said time-domain equalizer parameters $w_u(D)$ by selecting M consecutive samples of $w_u(D)$ to produce a set of windowed time-domain equalizer parameters $w_w(D)$, and (l) repeating steps (c) through (k) until a predetermined convergence condition is determined.

* * * * *